(12) United States Patent
Remes

(10) Patent No.: US 10,636,639 B1
(45) Date of Patent: Apr. 28, 2020

(54) METHODS FOR MULTIPLEXED MS-3 ANALYSES OF PEPTIDES

(71) Applicant: Thermo Finnigan LLC, San Jose, CA (US)

(72) Inventor: Philip M. Remes, San Jose, CA (US)

(73) Assignee: THERMO FINNIGAN LLC, San Jose, CA (US)

( * ) Notice: Subject to any disclaimer, the term of this patent is extended or adjusted under 35 U.S.C. 154(b) by 0 days.

(21) Appl. No.: 16/195,460

(22) Filed: Nov. 19, 2018

(51) Int. Cl.
    *H01J 49/00* (2006.01)
    *H01J 49/42* (2006.01)

(52) U.S. Cl.
    CPC ...... *H01J 49/0045* (2013.01); *H01J 49/0031* (2013.01); *H01J 49/0036* (2013.01)

(58) Field of Classification Search
    CPC .... H01J 49/42; H01J 49/0045; H01J 49/0031; H01J 49/0036; G01N 33/68; G01N 30/72
    USPC ................................ 250/281, 282, 283, 288
    See application file for complete search history.

(56) References Cited

U.S. PATENT DOCUMENTS

| | | |
|---|---|---|
| 5,952,653 A | 9/1999 | Covey et al. |
| 6,011,259 A | 1/2000 | Whitehouse et al. |
| 7,880,135 B2 | 2/2011 | Umemura |
| 9,048,074 B2 | 6/2015 | Senko |
| 9,960,027 B2 * | 5/2018 | McAlister ........... H01J 49/4215 |
| 10,151,758 B2 | 12/2018 | Yip et al. |
| 2004/0033530 A1 * | 2/2004 | Awrey ............... G01N 33/6848 435/7.1 |

(Continued)

FOREIGN PATENT DOCUMENTS

| | | |
|---|---|---|
| EP | 3249678 A1 | 11/2017 |
| JP | 2011215060 A | 10/2011 |

(Continued)

OTHER PUBLICATIONS

Ballard et al., "Dehydration of Peptide [M+H]+ Ions in theGas Phase", J Am Soc Mass Spectrom (1993) 4, pp. 477-481.

(Continued)

*Primary Examiner* — Nicole M Ippolito
(74) *Attorney, Agent, or Firm* — Thomas F. Cooney

(57) ABSTRACT

A method comprises: obtaining a precursor mass-to-charge value, $(m/z)_p$, of a target precursor ion having formula $[M+2A]^{2+}$, M being a peptide molecule and A being one or more adducts; generating ions from a sample by an ion source; purifying and fragmenting ions comprising the $(m/z)_p$, thereby generating a plurality of MS-2 species; co-purifying and co-fragmenting a selected subset of the MS-2 species, thereby generating a plurality MS-3 species, wherein each selected MS-2 species is a y-type ion species comprising a respective $(m/z)_f$ that is greater than $(m/z)_p$; mass analyzing the MS-3 species and selecting a subset thereof, each selected MS-3 species comprising a respective $(m/z)_g$ that satisfies a mass-to-charge selection criterion; and determining a quantity of the peptide from a summation of mass spectral intensities corresponding to the selected MS-3 species.

27 Claims, 13 Drawing Sheets

(56) References Cited

U.S. PATENT DOCUMENTS

| | | | | |
|---|---|---|---|---|
| 2013/0344524 | A1* | 12/2013 | Miyachi | G01N 33/6848 435/23 |
| 2014/0364337 | A1* | 12/2014 | Hermanson | G01N 33/60 506/12 |
| 2019/0234966 | A1* | 8/2019 | Steen | G01N 33/6896 |

FOREIGN PATENT DOCUMENTS

| | | |
|---|---|---|
| JP | 2012220365 A | 11/2012 |
| JP | 2012251878 A | 12/2012 |

OTHER PUBLICATIONS

Wysocki et al., "Mass spectrometry of peptides and proteins", Methods 35 (2005), pp. 211-222.

Fortin et al., "Peptide choice for MRM3 quantification in clinical evaluation of biomarkers", poster presented at American Society for Mass Spectrometry (ASMS) Asilomar Conference; Oct. 8-12, 2010 ; Pacific Grove, CA.

Lemoine et al., "The current status of clinical proteomics and the use of MRM and MRM3 for biomarker validation", Expert Review of Molecular Diagnostics 12, No. 4 (2012), pp. 333-342.

McAlister et al., "MultiNotch MS3 Enables Accurate, Sensitive, and Multiplexed Detection of Differential Expression across Cancer Cell Line Proteomes", Anal. Chem., 2014, 86, pp. 7150-7158.

Remes, "Multiplexed Targeted Assays Using Ion Trap Waveform Isolation", Poster Note 64734, ASMS 2016, https://assets.thermofisher.com/TFS-Assets/CMD/posters/PN-64734-Ion-Trap-Waveform-Isolation-ASMS2016-PN64734-EN.pdf.

Xu et al., "A hierarchical MS2/MS3 database search algorithm for automated analysis of phosphopeptide tandem mass spectra", Proteomics 2009, 9, 1763-1770.

* cited by examiner

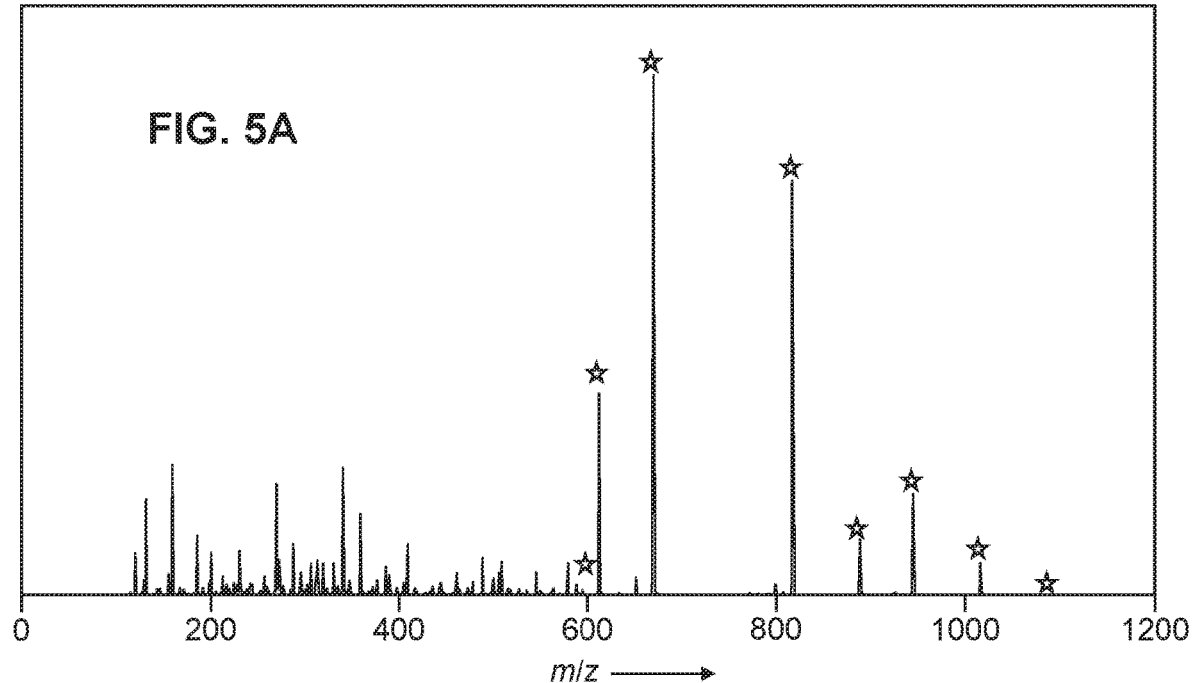
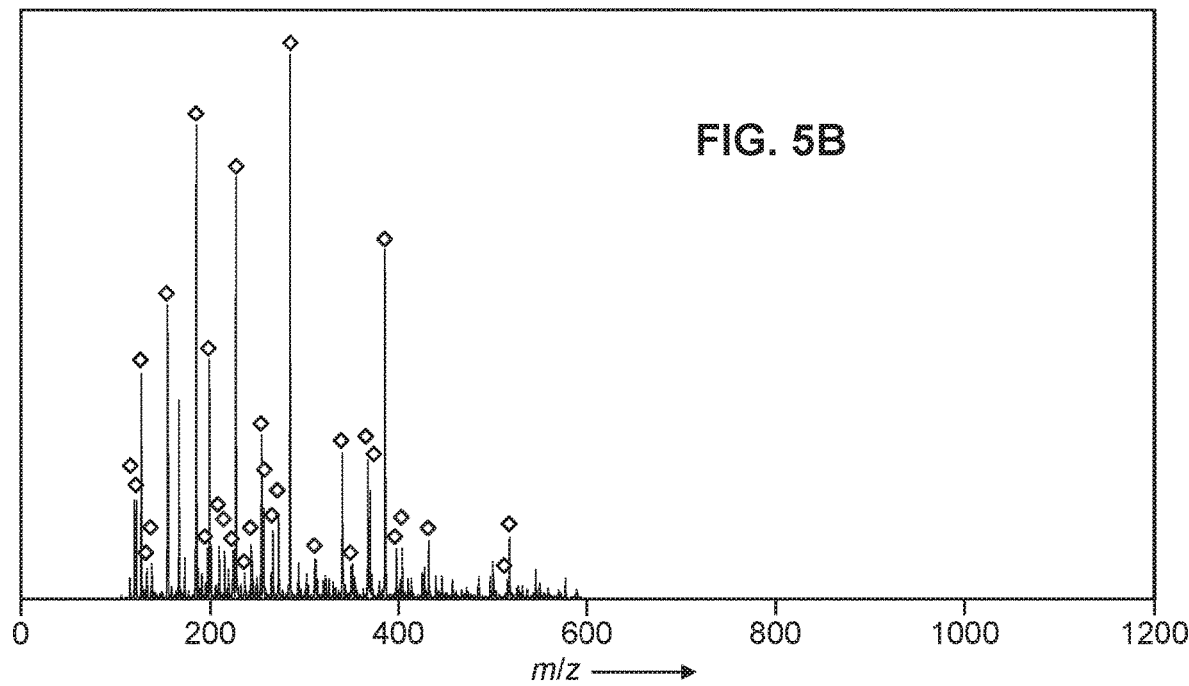

METHODS FOR MULTIPLEXED MS-3 ANALYSES OF PEPTIDES

FIELD OF THE INVENTION

The present invention relates generally to mass spectrometry and mass spectrometers and, more particularly, relates to MS-3 mass spectral analyses of peptides.

BACKGROUND OF THE INVENTION

Mass spectrometry has become the method of choice for fast and efficient identification of proteins in biological samples. Tandem mass spectrometry of peptides in a complex protein mixture can be used to identify and quantify the proteins present in the original mixture. Tandem mass spectrometers achieve this by selecting single mass-to-charge (m/z) values and subjecting the precursor ions to fragmentation, providing product ions that can be used to sequence and identify peptides. The information created by the product ions of a peptide can be used to search peptide and nucleotide sequence databases to identify the amino acid sequence represented by the spectrum and thus identify the protein—from which the peptide was derived. Analytical methods that compare the fragment ion pattern to theoretical fragment ion patterns generated computationally from sequence databases can be used to identify the peptide sequence. Such methods can identify the best match peptides and statistically determine which peptide sequence is more likely to be correct. The algorithms typically utilize m/z information for identification purposes of the various product ions.

Frequently, tandem mass analysis includes fragmenting a selected precursor (or "parent") ion and recording the mass spectrum of the resultant fragment ions. The information in the fragment ion mass spectrum is often a useful aid in elucidating the structure of the precursor ion. The general approach used to obtain a tandem mass spectrometry (MS/MS or MS-2) spectrum is to isolate a selected precursor ion with a suitable mass analyzer, and to subject the precursor ion to energetic collisions with a neutral gas so as to analyze the mass of the resulting fragment ions in order to generate a mass spectrum. To obtain more information from a precursor ion, an additional stage of MS can be applied to the MS/MS schemes outlined above, resulting in MS/MS/MS, or MS-3. For example, the collision cell may be operated as an ion trap, wherein fragment ions are resonantly excited to promote further CID.

FIG. 1 depicts a nomenclature typically adopted (and used herein) for the fragments of peptides and proteins. The accepted nomenclature for fragment ions was first proposed by Roepstorff and Fohlman (Roepstorff, P., and J. Fohlman. "Letter to the editors." Biological Mass Spectrometry 11, no. 11 (1984): 601-601.) and subsequently modified by Johnson et. al. (Johnson, Richard S., Stephen A. Martin, Klaus Biemann, John T. Stults, and J. Throck Watson. "Novel fragmentation process of peptides by collision-induced decomposition in a tandem mass spectrometer: differentiation of leucine and isoleucine." Analytical chemistry 59, no. 21 (1987): 2621-2625.) both of which are incorporated by reference herein in their entirety. The three possible cleavage points of the peptide backbone are called a, b and c when the charge is retained at the N-terminal fragment of the peptide and x, y and z when the charge is retained by the C-terminal fragment. The numbering indicates, which peptide bond is cleaved counting from the N and the C terminus respectively, and thus also the number of amino acid residues in the fragment ion. The number of hydrogens transferred to or lost from the fragment is indicated with apostrophes to the right and the left of the letter respectively. Peaks corresponding to ions that have lost ammonia (17 Da) and water (18 Da) are denoted, respectively, by superscript asterisks and circles to the right of the letter.

It has been observed that low-energy CID predominantly yields, when fragmentation is along the peptide backbone, fragment ions (ion products) of type a, b, and y; a*, b*, and y* and $a_o$, $b_o$, and $y_o$. By contrast, ETD produces mainly c and z* fragment ions and to a much smaller extent a*, y ions and z' and c* ions. Conventional analysis techniques are designed to deal with spectra containing only one type of fragments (c/z or b/y).

Targeted MS analysis of peptides is an important analytical procedure. For example, as a therapeutic test, the quantification of peptide abundance can be used as a proxy for the disease state of an organism. Most commonly, targeted MS/MS (MS-2) with liquid chromatography (LC) is used, the conventional method comprising selecting a peptide ion species from the eluting background species with a first stage of mass analysis, fragmenting the selected ion species, and measuring the so-formed fragments. For peptide analysis, the MS-2 experiment is relatively easy to setup, because for a given peptide sequence, the most abundant and selective MS-2 fragments can be predicted with a high probability to be backbone cleavages, where the charge is retained on the peptide C-terminus, or y-ions (see FIG. 1). A typical strategy is to interrogate the y-type ion species that have greater values of m/z than that of the precursor. Although it is usually necessary to validate the presence and selectivity of these transitions, this task is much simpler for a peptide molecule whose fragmentation has not been previously studied than it would be for other molecule classes, because the superset of most probable fragment ion species is known.

Although conventional MS-2 analysis provides a great deal of selectivity and throughput for peptide quantification, it has been estimated by some researchers that an additional 1-2 orders of magnitude of sensitivity are needed to rival the sensitivity levels achieved by immunoassays. One of the means that mass spectrometers have to achieve better sensitivity is to find ways to increase the selectivity of the measurements; that is, to reduce interference that gives rise to a high baseline and overlapping peaks, provided that the signal of the analyte is not reduced as fast as the interference "noise". For this reason, higher resolution mass analysis is in general preferred over nominal mass resolution, provided that other analytical figures of merit such as speed and signal abundance are sufficient. Other modes of increasing selectivity are increasingly being explored, such as coupling the ion outlet of ion mobility spectrometer to the ion inlet of a mass spectrometer.

Another well-known means of increasing MS selectivity is to perform additional stages of MS beyond MS-2, i.e. further stages of precursor isolation, fragmentation, and fragment-ion measurement. Traditionally, MS-3 analysis has been mostly used for qualitative tasks, such as peptide phospho-peptide site localization (e.g., see Xu, Hua, Liwen Wang, Larry Sallans, and Michael A. Freitas. "A hierarchical MS2/MS3 database search algorithm for automated analysis of phosphopeptide tandem mass spectra." *Proteomics* 9, no. 7 (2009): 1763-1770). More recently, MS-3 has been and is being used for global proteome characterization and quantification with isobaric labeling strategies, such as Tandem Mass Tags, in which all MS-2 precursors dissociate to form the same approximately 10 reporter ions in a known mass region (e.g., see McAlister, Graeme C., David P. Nusinow, Mark P. Jedrychowski, Martin War, Edward L. Huttlin, Brian K. Erickson, Ramin Rad, Wilhelm Haas, and Steven P. Gygi. "MultiNotch MS3 enables accurate, sensitive, and multiplexed detection of differential expression across cancer cell line proteomes." Analytical chemistry 86, no. 14 (2014): 7150-7158). In this method, the activation step to yield reporter ions uses a very high collision energy to drive all products to reporters, and so there is no emphasis on generation of normal peptide backbone diagnostic fragments, which could be used by themselves in a targeted setting.

The use of MS-3 as a general targeted peptide quantification strategy has thus not been well explored up to this point. The main reason is that, although the potential selectivity payoff is large, MS-3 has traditionally lacked sensitivity, so that very large dwell times have been needed to generate enough fragment ions to be analytically useful. For example, Lemoine et al (Lemoine, Jérôme, Tanguy Fortin, Arnaud Salvador, Aurore Jaffuel, Jean-Philippe Charrier, and Genevieve Choquet-Kastylevsky. "The current status of clinical proteomics and the use of MRM and MRM3 for biomarker validation." *Expert review of molecular diagnostics* 12, no. 4 (2012): 333-342) report that typical periods between targeted MS-3 scans were 300 ms. This problem has been ameliorated to a considerable extent with the advent of multinotch isolation (op. cit.), where multiple MS-2 fragments are simultaneously isolated and fragmented, such that the period between scans can be on the order of 30 ms. Nonetheless, there remains a need for a general-purpose procedure for performing multiplexed MS-3 on any particular given peptide sequence, especially in the absence of prior knowledge about the peptide's fragmentation behavior. This is important, because a typical translational workflow between discovery and targeted proteomics could involve the analysis of hundreds or thousands of peptides, leaving little time for the manual optimization of parameters for several different peptides of interest or of potential interest. The presently-known MS-3 methods would require a priori information regarding which MS-2 fragment ions should be isolated and further fragmented, which MS-3 fragment ions are formed from the activation of the MS-2 fragment ions and which of these are most useful for quantitation. The methods of the present teachings address the above-noted need in the art by advantageously providing the ability to make or obtain qualitative and quantitative analysis of certain peptide analytes, even in situations in which the precise fragmentation behavior of the analyte or analytes is not known in advance.

SUMMARY OF THE INVENTION

This document describes a procedure for performing MS-3 peptide analysis for a targeted peptide for which specific fragmentation data is not available. In accordance with the present teachings, the most abundant MS-2 fragments are typically in a predictable m/z region relative to the precursor ion, and the most abundant MS-3 fragments from the simultaneous isolation and fragmentation of the MS-2 fragments are in another region, typically at m/z values less than the original precursor ion. In accordance with the present teachings, a general-purpose targeted MS-3 method for any given peptide comprises isolating the y-type first-generation fragment-ion ion species having m/z values that are greater than the precursor m/z, fragmenting the isolated first-generation fragment ion species so as to generate second-generation y-type fragment-ion species and quantifying using second-generation y-type fragment-ion species whose m/z values are less than a certain m/z. Additional techniques are disclosed for performing resonance excitation activation of multiple precursor ions trapped in the same storage device.

In accordance with a first aspect of the present teachings, a method for mass spectrometry of a target peptide is disclosed, the method comprising: (a) receiving or calculating a precursor mass-to-charge value, $(m/z)_p$, of a target precursor ion species having the general formula $[M+2A]^{2+}$, where M represents the composition of the neutral target peptide molecule and each of the two adducts, A, is either a proton or an alkali-metal cation; (b) introducing a portion of a sample into an ion source of a mass spectrometer, wherein the ion source is capable of generating the target precursor ion species by ionization of the target peptide, if present, in the sample; (c) generating ions from the sample by the ion source; (d) purifying and fragmenting ions comprising the $(m/z)_p$, thereby generating a plurality of first-generation fragment-ion species (MS-2 species) therefrom; (e) co-purifying and co-fragmenting a selected subset of the plurality of generated MS-2 species, thereby generating a plurality of second-generation fragment-ion species (MS-3 species) therefrom, wherein each of the selected MS-2 species is a y-type ion species and comprises a respective fragment mass-to-charge value, $(m/z)_f$, that is greater than $(m/z)_p$; (f) mass analyzing the MS-3 species and selecting a subset of the plurality of generated MS-3 species, wherein each of the selected MS-3 species comprises a respective second-generation fragment mass-to-charge value, $(m/z)_g$, that satisfies a mass-to-charge selection criterion; and (g) determining a quantity of the target peptide in the sample from a summation of mass spectral intensities corresponding to the selected MS-3 species.

In various embodiments, the selection of the subset of the plurality of generated MS-3 species is such that each selected MS-3 species is a y-type ion species. In various other embodiments, the selection of the subset of the plurality of generated MS-3 species is such that only MS-3 species whose peak intensities are observed to be positively correlated with one another are selected, regardless of whether they comprise y-type or non y-type ion species. Such correlation may comprise co-varying of the peak intensities during chromatographic elution.

In various embodiments, the mass-to-charge selection criterion is such that a second-generation fragment mass-to-charge value, $(m/z)_g$, satisfies the criterion if $(m/z)_g$ is less than $(m/z)_p$. In various embodiments, the mass-to-charge selection criterion is such that a second-generation fragment mass-to-charge value, $(m/z)_g$, satisfies the criterion if $(m/z)_g$ is less than the lowest m/z value among all of the MS-2 species that are co-purified and co-fragmented. In various embodiments, the selecting of the subset of the plurality of generated MS-2 species comprises selecting the $n_1$ most abundant y-type MS-2 species for which it is true that $(m/z)_f$ is greater than $(m/z)_p$, wherein $n_1$ is a pre-decided positive integer. In various embodiments, the selecting of the subset of the plurality of generated MS-3 species comprises selecting the $n_2$ most abundant y-type MS-3 species that satisfy the mass-to-charge selection criterion, wherein $n_2$ is a pre-decided positive integer. In various embodiments, the co-fragmenting of the selected subset of the plurality of generated MS-2 species comprises sequentially fragmenting the selected MS-2 species of the subset by resonant-excitation-type collision-induced dissociation and in reverse order of their mass-to-charge ratios. In various embodiments, the m/z values of the ion species of the selected subset of the plurality of generated MS-2 species and the m/z values of the ion species of the selected subset of the plurality of generated MS-3 species are input from a database entry. In various other embodiments, the co-fragmenting of the selected subset of the plurality of generated MS-2 species comprises fragmenting the selected MS-2 species of the subset by beam-type collision-induced dissociation. In various embodiments, the sample is prepared by tryptic digestion of a protein-bearing sample.

In accordance with a second aspect of the present teachings, a mass spectrometer system is disclosed, comprising: (a) a mass spectrometer comprising: (a1) an ion source; (a2) an ion selection or purification apparatus configured to receive ions from the ion source; (a3) a fragmentation cell configured to receive ions from the ion selection or purification apparatus; (a4) a mass analyzer configured to receive either precursor ions from the ion selection or purification apparatus or fragment ions from the fragmentation cell; and (a5) a detector configured to receive ions from the mass analyzer; (b) a power supply electrically coupled to the mass spectrometer; and (c) a controller electrically coupled to the mass spectrometer and the power supply, wherein the controller comprises computer-readable instructions operable to cause the controller to either directly perform or to cause the mass spectrometer to perform at least some of the above-outlined method for mass spectrometry of a target peptide.

BRIEF DESCRIPTION OF THE DRAWINGS

The above noted and various other aspects of the present invention will become apparent from the following description which is given by way of example only and with reference to the accompanying drawings, not drawn to scale, in which:

FIG. 5A is a mass spectrum of first-generation fragment ions (i.e., an MS-2 mass spectrum) generated by fragmentation of the 2+ ion species of the peptide composed of the sequence SFANQPLEVVYSK that was mixed into the HeLa protein-extract tryptic digest of FIG. 2, where the mass spectral lines indicated by star symbols denote the y-type first-generation fragment ion species that are selected for co-isolation and simultaneous fragmentation, each selected ion species having an m/z that is greater than the m/z of its respective precursor ion;

FIG. 5B is a mass spectrum of second generation fragment ions (i.e., an MS-3 mass spectrum) generated by simultaneous fragmentation of the selected first-generation fragment ion species indicated in FIG. 5A, where the second-generation ion species that were used for quantification are indicated by diamond symbols;

DETAILED DESCRIPTION

Figure 1:
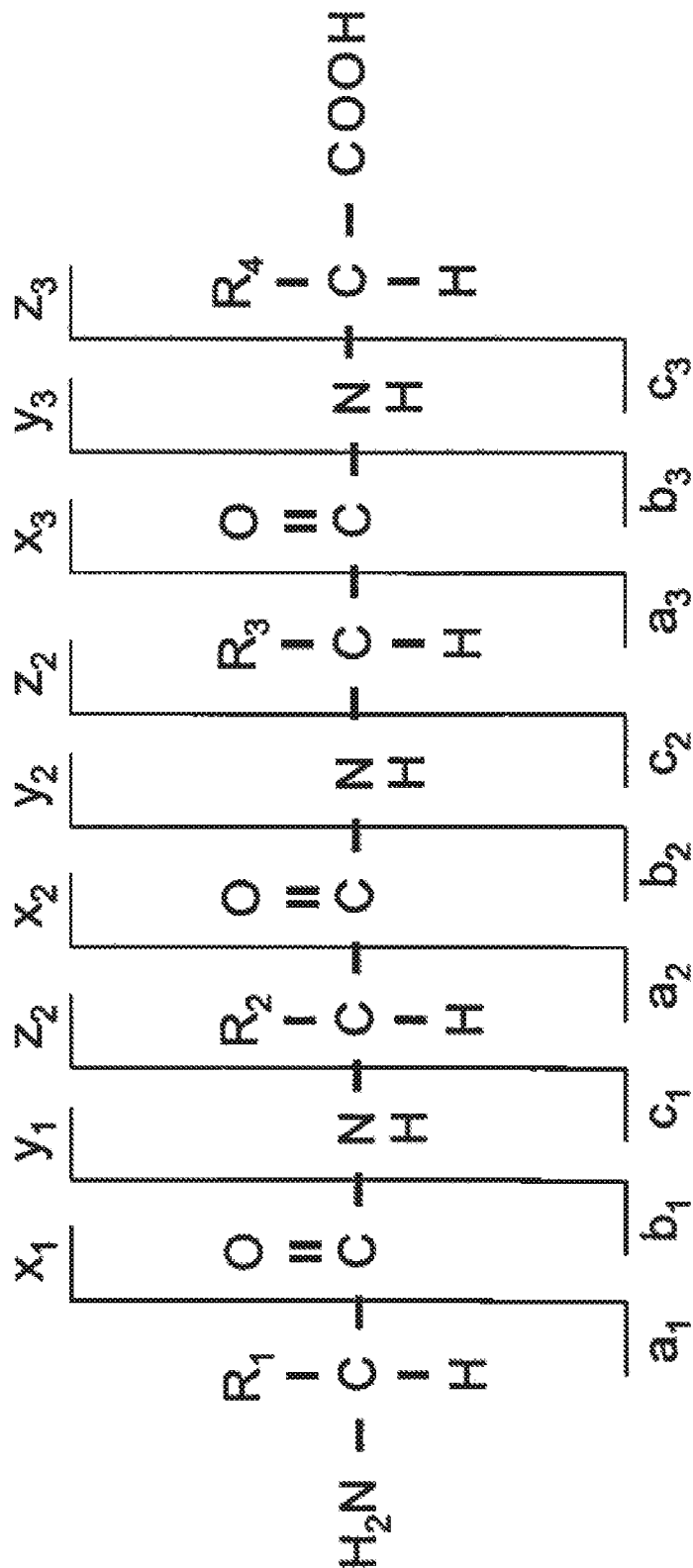
FIG. 1 is a graphical depiction of a peptide backbone structure illustrating a nomenclature typically adopted for fragment ions of peptides and proteins.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. The particular features and advantages of the invention will become more apparent with reference to the appended figures taken in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Thus, as used herein, "a" or "an" also may refer to "at least one" or "one or more" unless otherwise stated. Also, unless otherwise stated, the use of "or" is inclusive, such that the phrase "A or B" is true when "A" is true, "B" is true, or both "A" and "B" are true.

It is also to be understood that, for any given component or embodiment described herein, any of the possible candidates or alternatives listed for that component may generally be used individually or in combination with one another, unless implicitly or explicitly understood or stated otherwise. It will be understood that any list of such candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements.

Unless otherwise defined, all technical and scientific terms used herein have the meaning commonly understood by one of ordinary skill in the art to which this invention belongs. In case of conflict, the present specification, including definitions, will control. It will also be appreciated that there is an implied "about" prior to the quantitative terms mentioned in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting.

Aspects of the present teachings relate to so-called targeted mass spectrometric analyses. The phrase "targeted analysis", as used herein, refers to a measurement or set of measurements directed to detecting the presence of and/or determining a measure of the abundance or relative abundance of a particular known analyte of interest within a sample. Accordingly, the analyte of interest of which the abundance and/or presence is to be determined may be referred to as a "targeted analyte" and ion species generated by ionization of the targeted analyte or by fragmentation of ion species generated by ionization of the targeted analyte may be referred to as "targeted ion species". Similarly, mass spectral peaks or lines that correspond to the targeted ion species may be referred to as "targeted mass spectral peaks" or "targeted mass spectral lines".

As used in this document, the term "MS-2" (or, equivalently, $MS^2$ or "MS/MS") refers to a sequence of events in which: (a) a precursor-ion species of interest comprising a mass-to-charge value of $(m/z)_p$, is purified or partially purified; (b) the purified or partially purified precursor-ion species is/are fragmented in a fragmentation cell or collision cell so as to generate first-generation product ions of a plurality of first-generation product-ion species having mass-to-charge values, $(m/z)_{f1}$, $(m/z)_{f2}$, $(m/z)_{f3}$, . . . ; and (c) the product-ion species are mass analyzed in order to verify their presence and/or to measure their abundances or relative abundances. When used to specifically refer to one or more ion species, the term "MS-2" is used to denote first-generation product ion species. Similarly, when specifically used to refer to one or more ion species, the term "MS-1" is used to denote precursor ion species.

As used in this document, the term MS-3 (or, equivalently, $MS^3$ or "MS/MS/MS") refers to a sequence of events in which: (a) a precursor-ion species of interest comprising a mass-to-charge value of $(m/z)_p$, is purified or partially purified; (b) the purified or partially purified precursor-ion species is/are fragmented in a fragmentation cell or collision cell so as to generate first-generation product ions of a plurality of first-generation product-ion species having mass-to-charge values, $(m/z)_{f1}$, $(m/z)_{f2}$, $(m/z)_{f3}$, . . . ; (c) a first-generation product-ion species of interest, $(m/z)_{fn}$, is purified or partially purified; (d) the purified or partially purified first-generation product-ion species is/are fragmented in a fragmentation cell or collision cell so as to generate second-generation product ions of a plurality of second-generation product-ion species having mass-to-charge values, $(m/z)_{g1}$, $(m/z)_{g2}$, $(m/z)_{g3}$, . . . ; and (e) the second-generation product-ion species are mass analyzed in order to verify their presence and/or to measure their abundances or relative abundances. When used to specifically refer to one or more ion species, the term "MS-3" is used to denote second-generation product ion species.

As used in this document, the term "fragmentation event" refers to fragmentation of ions comprising one or a plurality of ion species of interest within a fragmentation cell or collision cell. If ions of more than one ion species are fragmented in the fragmentation event, they may be fragmented either sequentially or simultaneously. For example, sequential fragmentation during the fragmentation event may comprise providing a continuous stream of ions to the fragmentation or collision cell, wherein the different ion species are introduced into the ion stream at different respective times. Alternatively, simultaneous fragmentation may comprise an initial step of accumulating the various different precursor ion species within an ion storage device and subsequently releasing the mixture of ions into the fragmentation or collision cell. The term "co-fragmentation", as used herein, refers to fragmentation of a plurality of ion species (either sequentially or simultaneously) in a single fragmentation event.

Once generated within a fragmentation cell or collision cell, product ions (first generation or second generation) may be transmitted directly to a mass analyzer having a detector for mass analysis and detection. Alternatively, the product ions generated by either a single fragmentation event or a plurality of fragmentation events, as defined above, may be accumulated as a mixture of ion species within an ion storage device prior to their introduction into a mass analyzer. The mixture of product ion species may be than transferred to a mass analyzer having a detector for simultaneous mass analysis and detection.

The term "purified", as used above and elsewhere herein, refers to an individual ion species that remains after a procedure of eliminating other contaminant or background ion species that are not of interest from the particular individual ion species of interest. Operationally, this is generally performed by eliminating ions that comprise ink values that are outside of a certain ink range about the particular ink of the ion species of interest such as, for example, outside of a range of ±2 Th or ±1 Th about the particular ink value. The (preferably) single ion species that remains within a mass spectrometer or mass analyzer after elimination of the various ion species that are not of interest may be referred to as a "purified" ion species or, alternatively, an "isolated" ion species.

The term "partially purified", as used above and elsewhere herein, refers to an ion species, having mass-to-charge value of $(m/z)_1$, that remains after a procedure of eliminating other contaminant or background ion species that are not of interest while, at the same time, retaining other ion species of interest, having mass-to-charge values, $(m/z)_2$, $(m/z)_3$, $(m/z)_4$, ..., etc. together with each other and with the ion species having the mass-to-charge value $(m/z)_1$. According to this definition, an ion species is partially purified when it is present in a mixture that also comprises a finite number of other selected ion species of interest but that does not include at least some other ion species that are not of interest. This definition of partial purification includes cases in which at least some low-abundance contaminant or background ion species that are not of particular interest may remain admixed with the ion species of interest after the partial purification procedure. Operationally, the partial purification procedure may be performed by eliminating ions that comprise m/z values that are not within a certain m/z range (such as a ±2 Th or ±1 Th range) about at least one of $(m/z)_1$, $(m/z)_2$, $(m/z)_3$, $(m/z)_4$, ..., etc. Alternatively, the partial purification procedure may comprise elimination of ion species having m/z values either greater than or less than a particular m/z value while retaining all other ion species. The plurality of ion species that remains within a mass spectrometer or mass analyzer after elimination of the various ion species that are not of interest may be referred to as a "co-purified" ion species or, alternatively, "co-isolated" ion species. As used in this document, the term "co-purification" refers to the process of creating such a mixture of ion species. The terms "purification" and "co-purification", as used herein, are intended to include various processes that are referred to in the art as "isolation" and "co-isolation", respectively.

In some instances, the partial purification may include purifying the various ion species of interest individually and then storing them together in an ion storage apparatus. In some instances, the partial purification may include multi-notch co-purification within an ion trap or while passing the ions through a quadrupole mass filter. Multi-notch co-purification, which is further described in United States pre-Grant Publ. No. 2014/0339421 that is incorporated by reference herein in its entirety, is a procedure in which the ions that are not of interest are all eliminated in a single purification event.

Figure 9:
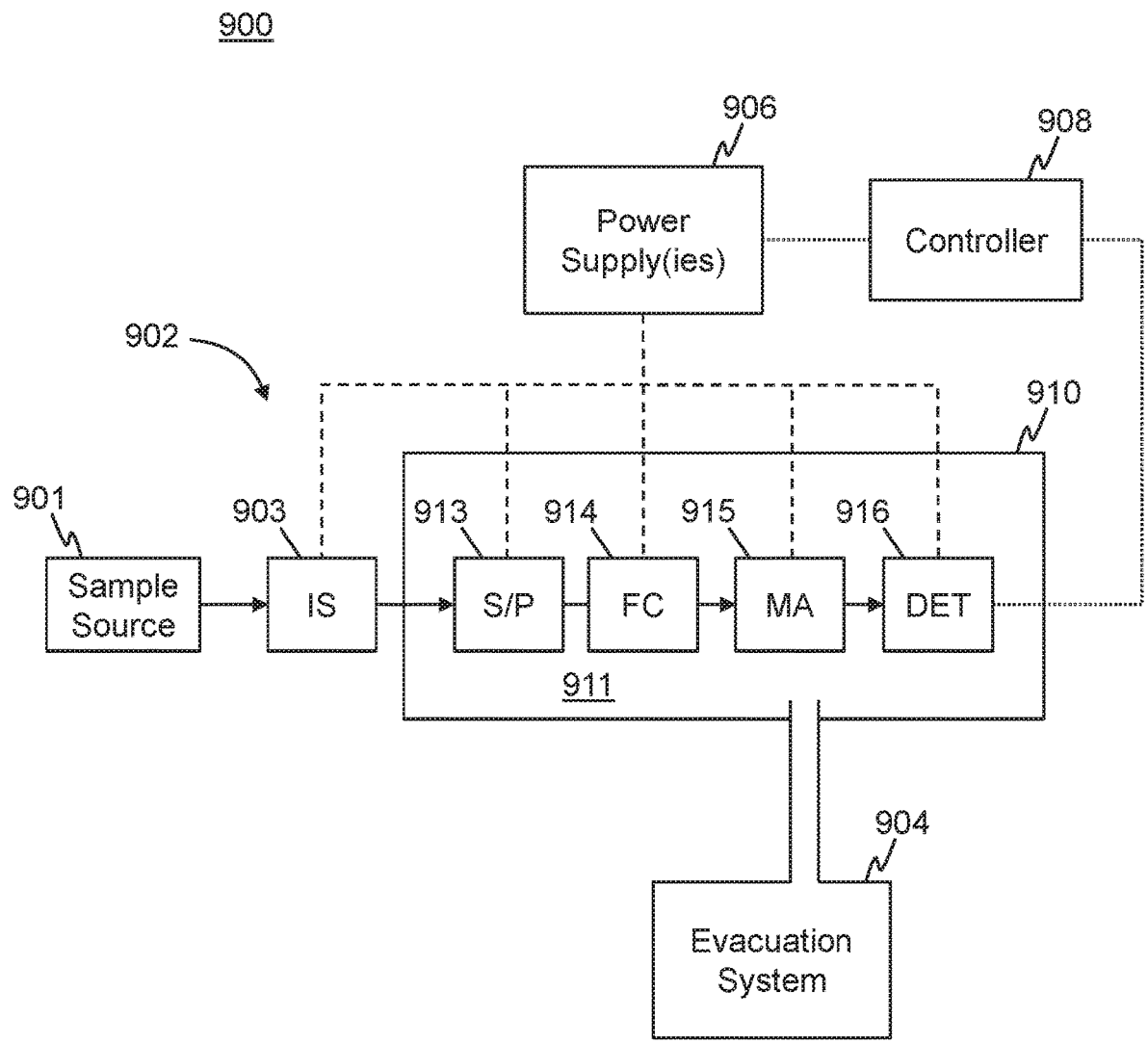
FIG. 9 is a schematic block diagram of an exemplary mass spectrometry system, in accordance with various embodiments of the present teachings.

Reference is now made to FIG. 9, which is a schematic block diagram of an exemplary mass spectrometry system, in accordance with various embodiments of the present teachings or, alternatively, on which embodiments in accordance with the present teachings may be practiced. Various embodiments of mass spectrometry system 900 can include components as displayed in the block diagram of FIG. 9. According to various embodiments, the mass spectrometry system 900 can include a mass spectrometer 902 that includes an evacuated housing 910 whose interior 911 is maintained under vacuum by an evacuation system 904, a controller 908 and one or more power supplies 906 that supply one or more appropriate oscillatory (AC) voltages, oscillatory radio-frequency (RF) voltages or non-oscillatory (DC) voltages to various electrodes of the mass spectrometer. The mass spectrometer 902 includes an ion source 912 (that may be either within or outside of the evacuated housing 910) that ionizes molecules of compounds received from a sample source 901; an ion selection or purification (S/P) device 913, that purifies or partially purifies ions of selected ion species; a fragmentation cell (FC) 914 that fragments ions by either beam-type (bCID) or resonant-excitation-type (rCID) collision-induced dissociation; a mass analyzer (MA) 915 that is configured to receive either precursor ions from the ion selection or purification device or fragment ions from the fragmentation cell functions to separate ion species or to otherwise distinguish ion species according to their various mass-to-charge (m/z) values; and a detector 916 that detects and measures the quantities of the various ion species.

In various embodiments, the ion selection or purification (S/P) device 913 may comprise a quadrupole mass filter that passes only selected ion species completely therethrough or a multipole ion trap, such as a three-dimensional trap or a linear ion trap, that is configured to resonantly eject unwanted ions from the trap while retaining selected ions. In various embodiments, ion source 903 generates a plurality of ions from a sample. The ion source can be a matrix assisted laser desorption/ionization (MALDI) source or an electrospray ionization (ESI) source a thermospray ion source, a paper spray ion source or any other ion source that is able to generate a measurable proportion of ions having the general formula $[M+2A]^{2+}$, where M represents the composition of a neutral peptide molecule and A represents an adduct ion that carries a single positive charge and where each of the two adducts, A, may be either a proton or an alkali-metal cation. Thus, use used herein, the general formula $[M+2A]^{2+}$ represents any of $[M+2H]^{2+}$, $[M+2Na]^{2+}$, $[M+H+Na]^{2+}$, etc. Electrospray ionization of tryptic digests of peptides is known to generate a high proportion of doubly protonated so-called "molecular ions" having the formula $[M+2H]^{2+}$ (see, for example, U.S. Pat. No. 5,952,653 which is incorporated herein by reference in its entirety). However, such ion species as well as ions of having the general formula $[M+2A]^{2+}$ may be generated in lesser proportions, in the absence of tryptic digestion, by the ion source types listed above.

In various embodiments, the mass analyzer 915 can separate ions based on the m/z values of the ions. For example, the mass analyzer 915 can include a quadrupole mass filter analyzer, a quadrupole ion trap analyzer, a time-of-flight (TOF) analyzer, an electrostatic trap (e.g., ORBITRAP) mass analyzer, Fourier transforms ion cyclotron resonance (FT-ICR) mass analyzer, and the like. In various embodiments, the ion detector 106 can detect ions. For example, the ion detector 106 can include an electron multiplier, a Faraday cup, and the like. Ions leaving the mass analyzer can be detected by the ion detector. In other instances, the ion trap can comprise a set of detector electrodes of an electrostatic trap mass analyzer and ions are detected by means of image currents that are induced within the electrodes as ions move within the trap. In various embodiments, the ion detector can be quantitative, such that an accurate count of the ions can be determined. The mass spectrometer can comprise numerous additional components (not shown) such as partitions of the vacuum chamber, ion transfer tubes, collision gas supplies and inlets, ion guides and ion switches for routing ions between components and ion lenses or gates for controlling the timing of ion flow between components, for controlling ion kinetic energy, for focusing ion beams, or for inhibiting ion flow.

In various embodiments, the controller 908 can control operation of the mass spectrometer 902 by communicating with the one or more power supplies 906 so as to provide voltages or voltage waveforms to electrodes of the mass spectrometer that cause appropriate manipulation or flow of ions. Alternatively, the controller may send command signals directly to components of the mass spectrometer such as the ion source 903, the selection/purification device 913, the fragmentation cell 914, the mass analyzer 915 and/or the ion detector 916. The controller 908 may also receive data obtained by and communicated from the detector 916. The controller 908 may receive information from sensors (e.g., temperature, pressure, etc.) at various locations within the mass spectrometer.

The controller 908 includes at least one central processing unit ("CPU") coupled to electronic memory. Each CPU is typically implemented in hardware using circuit logic disposed on one or more physical integrated circuit devices or chips. Each CPU may be or may include one or more microprocessors, microcontrollers, field programmable gate arrays, or ASICs, while the electronic memory may include random access memory ("RAM"), dynamic random access memory ("DRAM"), static random access memory ("SRAM"), flash memory, and/or another digital storage medium, and also typically implemented using circuit logic disposed on one or more physical integrated circuit devices, or chips. As such, the memory may be considered to include memory storage physically located elsewhere, e.g., any cache memory in the at least one CPU, as well as any storage capacity used as a virtual memory, e.g., as stored on a mass storage device or as stored on a local network or on the Internet, as coupled to the controller through at least one network interface. The memory may be provided with computer-readable electronic instructions (e.g., a program) that, when accessed by and executed by the controller's logic circuitry, cause the controller to 908 operate the hardware components of the mass spectrometer system 900 so as to execute the below-described mass spectrometry methods in accordance with the present teachings.

The controller may contain or may be provided with computer-readable programmatic code that causes the mass spectrometer to execute methods in accordance with the present teachings as are described below. For example, the controller 908 may transmit commend signals, during execution of the code, that configure the ion source 903 or that enable/disable the ion source. Additionally, the controller 908 may transmit commands, during execution of the code, that configure the mass analyzer 916 to select a particular mass range to detect, that cause the ions of a particular species to be purified or partially purified, that adjust the sensitivity or gain of the ion detector 916, that cause selected ion species to be transmitted to the fragmentation cell 914 and fragmented therein, that cause selected ion species to be accumulated in an ion storage device (not shown) that cause ions to be transmitted to the detector 916, etc. The execution of the programmatic code may automatically vary in accordance with or in response to measurement date received from the detector 916.

As a prelude to investigating the question of how to systemize the selection of MS-3 fragment-ion species for any given peptide analyte, a first problem is to re-verify the conventional wisdom that the y-type MS-2 peptide ion species having the greatest m/z values should provide the best MS-2 diagnostic results, by measuring the abundance and specificity of these ions. These results can later be compared to the specificity of MS-3 ion species. To do the re-verification, a standard LC-MS experiment was performed; wherein 1 µg of trypsin-digested protein from the Henrietta Lacks (HeLa) cell line (source, Sigma Aldrich) was introduced to a nano-LC in a 140 minute gradient at 300 nl/min. The eluent was analyzed in the data dependent acquisition (DDA) fashion, in which a series of survey mass spectra were acquired and the doubly-charged (2+) ion species is isolated and fragmented. The resulting fragment ion species (MS-2 species) were mass analyzed. The data were analyzed with the Proteome Discoverer (PD) 2.1 pipeline, available from Thermo Fisher Scientific of Waltham, Mass., USA. The PD analyses included determining the peptide sequences that gave rise to the MS-2 spectra by matching the experimental fragments with a database of theoretically generated fragments from all possible peptides, coupled with statistical analysis to determine the significance of these matches. This procedure resulted in the determination of 150000 peptide sequences, of which 43000 were unique sequences. The spectra for the common sequences were averaged together, and the peak intensities were assigned into bins according to the scheme illustrated in FIG. 1, where for example index "1" corresponds to the first y-type ion species that is greater in ink than the 2+ precursor m/z. These data indicate that the y-type MS-2 ions clearly have the largest intensity of any ion type, and that those with m/z greater than the precursor have the highest abundance.

To determine the utility of these y ions to serve as unique identifiers for their respective peptide sequences, the same type of DDA experiment was performed multiple times using a 40 minute gradient, which is more characteristic of the time frames common for high throughput targeted peptide analysis. The results of four separate experiments were pooled, to yield 25 k unique sequences. For each of these peptides, the probability that its y-ions would be free of interferences from (also referred to as "collisions with") fragment ions of all other peptides in the ensemble was computed. This collision analysis subjects the peptide data to a series of filter conditions to determine whether a collision is presumed to occur. According to the filter conditions, a collision was presumed to occur if the 2+ precursor masses were within ±0.35 Da, if the retention times were within ±1.0 min, and if any theoretical fragment ions were within either ±0.35 Da or ±0.0125 Da of a prospective y-ion. These latter two ranges are typical for quadrupole mass analyzer resolution and ORBITRAP™ electrostatic trap mass analyzer resolution, respectively.

Figure 3A:
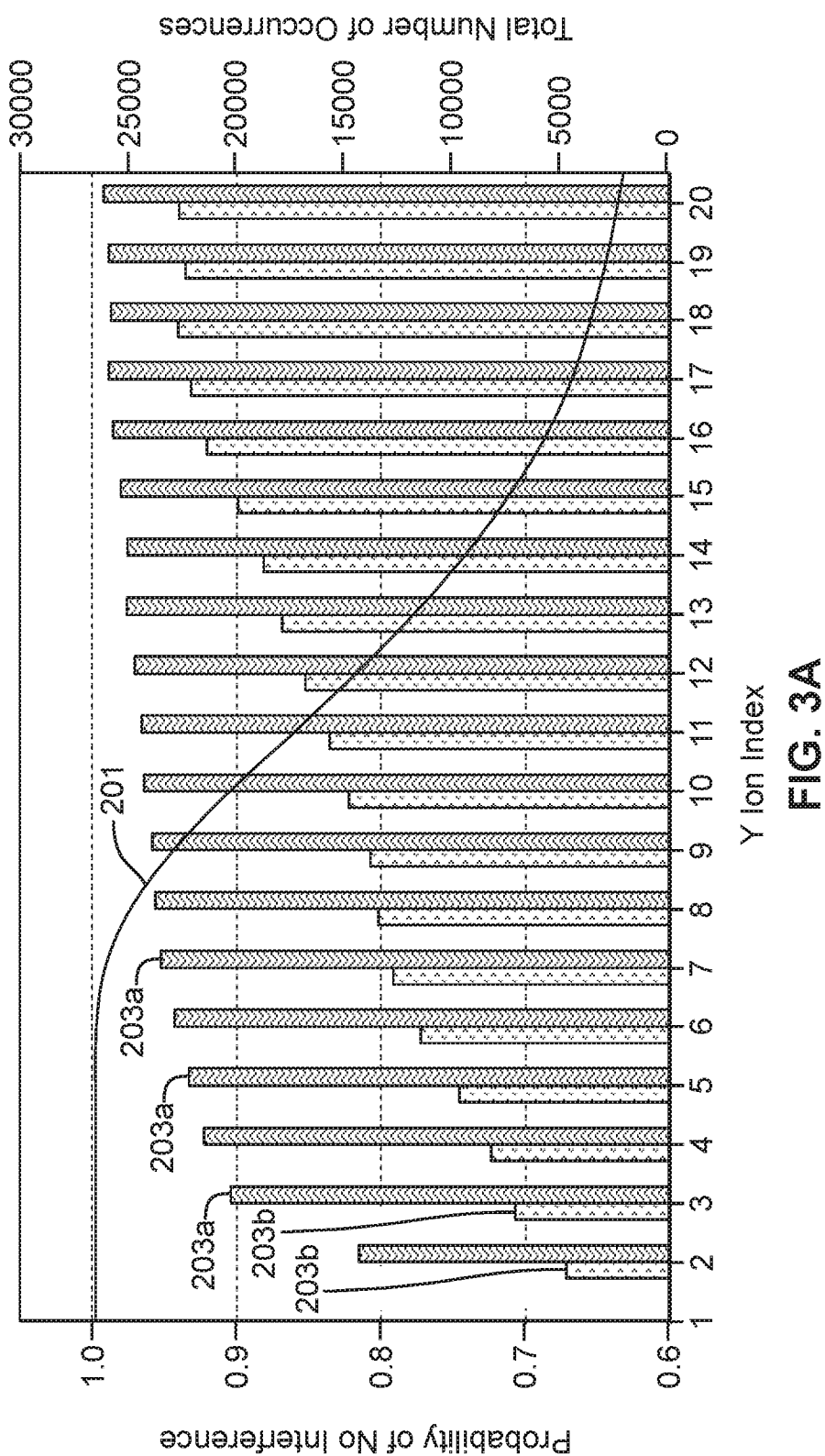
FIG. 3A is a plot (solid line) of the total number of occurrences versus conventionally-assigned fragment-ion indices, of approximately 25000 fragment-ion unique sequences of the tryptic digest of FIG. 2, as resulted from fractionation of the digest in a nano-liquid chromatography separation having a 40-minute gradient, further including bar charts representing the calculated probabilities, versus the assigned fragment-ion indices, of unambiguously assigning observed mass spectral lines to ion sequences under two different constraint scenarios.
Figure 3B:
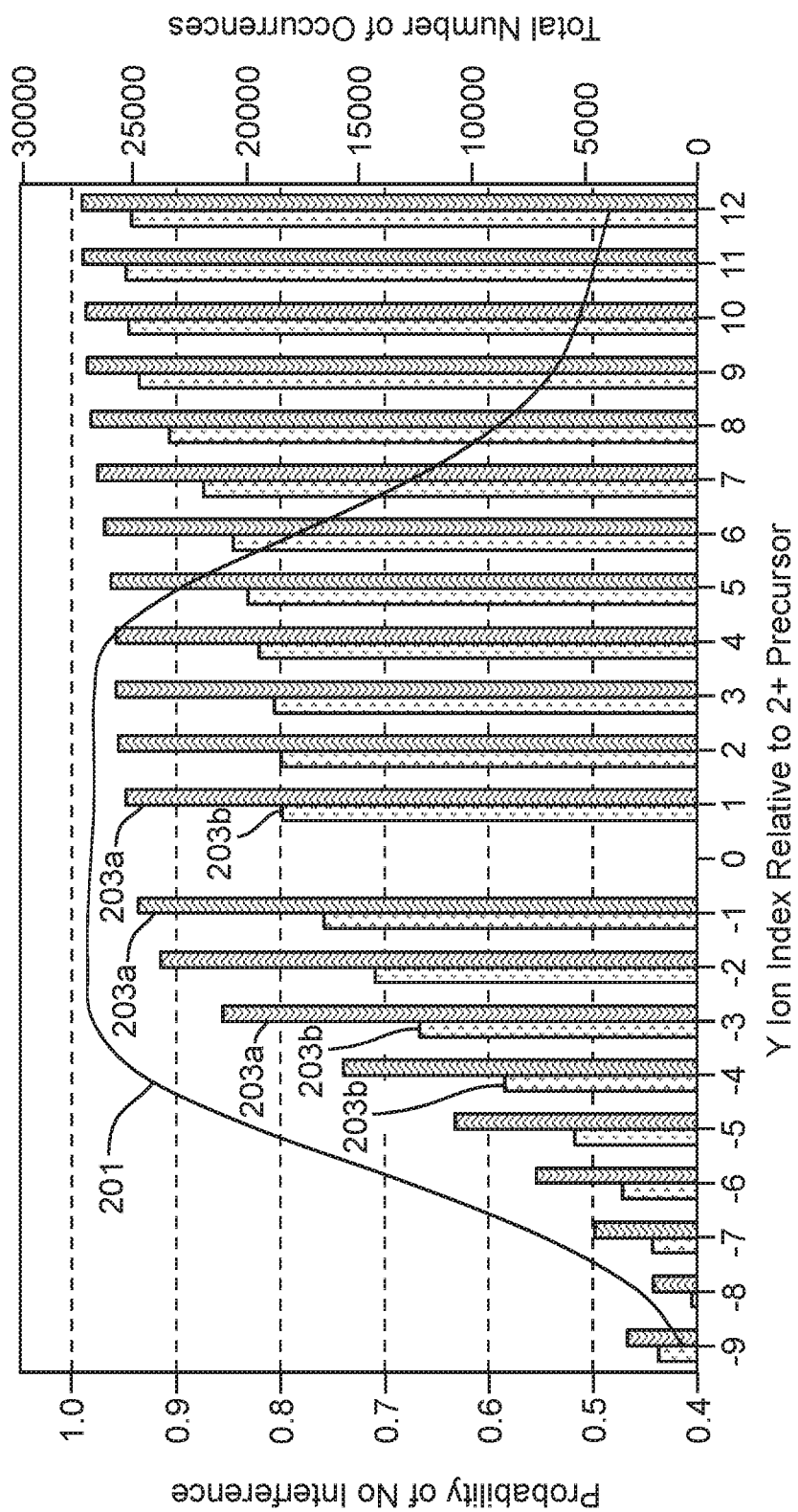
FIG. 3B is a re-plot of the data of FIG. 3A, wherein each fragment-ion index is taken relative to the m/z of the respective doubly-charged precursor ion.

The results of the above-described set of data-dependent experiments and subsequent analysis are depicted in FIGS. 3A and 3B in which histograms illustrate the probability that each particular y-type fragment ion will be free from any interferences (collisions) under the assumed filter conditions. In FIG. 3A, the y-ion indices are assigned according to convention (e.g., see FIG. 1); in FIG. 3B, the index of each y-type ion is re-assigned relative to the m/z position of its respective precursor ion and the data are consolidated in terms of the so re-assigned indices. The histogram bars 203a in FIGS. 3A-3B correspond to filter conditions in which a collision is presumed to occur when the m/z values of two y-type fragment-ion species are within ±0.0125 Da of one another; the histogram bars 203b in FIGS. 3A-3B correspond to filter conditions in which a collision is presumed to occur when the m/z values of two y-type fragment-ion species are within ±0.35 Da of one another. Curve 201 in each of FIG. 3A-3B is a plot of the number of mass spectral peaks included in each histogram bin and is a measure of the distribution of peptide fragment sizes. The results confirm the conventional wisdom, demonstrating that the larger a peptide is, the more likely it is to be free from interferences. Of note is that the position of the 2+ precursor serves as a general boundary between ions with high and low collision probability. Accordingly, a useful and simple rule for choosing the first-generation ion species (i.e., MS-2 ion species) that are to undergo co-isolation and co-fragmentation is to choose the $n_1$ most abundant y-type ion species having m/z values that are greater than the m/z value of the precursor ion, where $n_1$ is a pre-decided number. Additionally, the benefit of accurate-mass MS-2 analysis is demonstrated in the increased likelihood of measuring a y-transition free from interference with a ±0.0125 Da tolerance compared to a ±0.35 Da tolerance. These tolerances represent mass analysis resolutions of about 20 k and 700 at m/z 500, respectively.

Figure 4A:
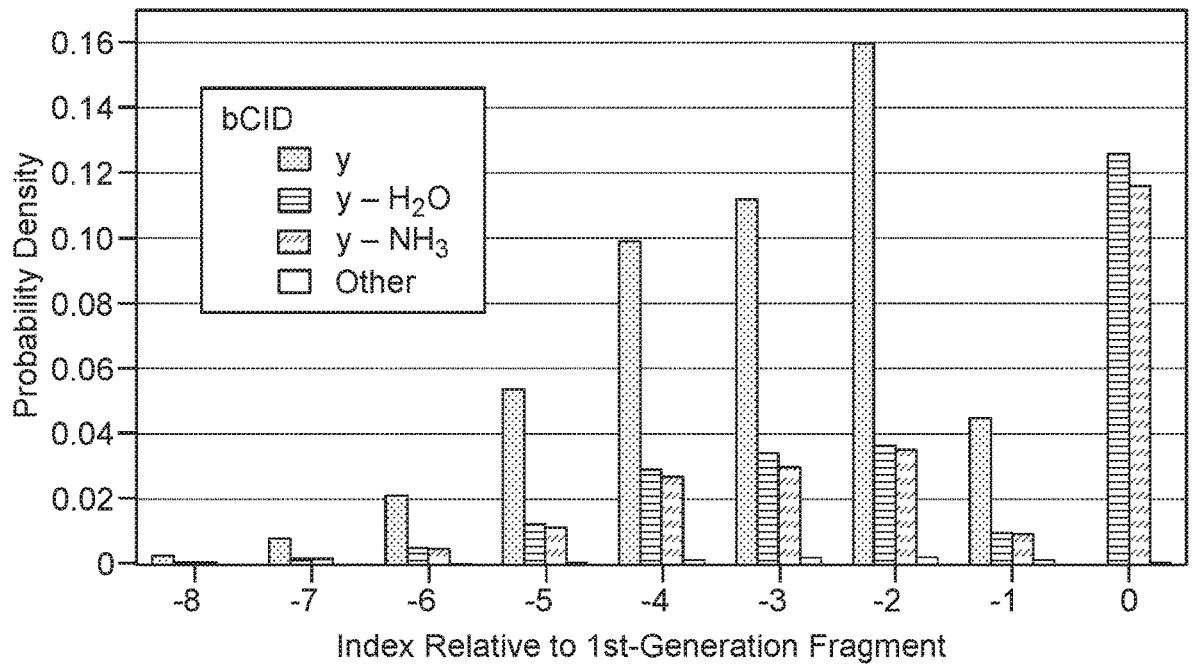
FIG. 4A is a set of histograms of the observed distributions of various ion types, relative to assigned fragment-ion indices, of second-generation fragment-ion unique sequences obtained by fragmenting selected first-generation fragment ions of the tryptic digest of FIG. 2 using beam-type collision-induced dissociation, wherein the digest was fractionated in a nano-liquid chromatography separation having a 40-minute gradient and wherein each fragment-ion index is taken relative to the m/z of the respective doubly-charged precursor ion.
Figure 4B:
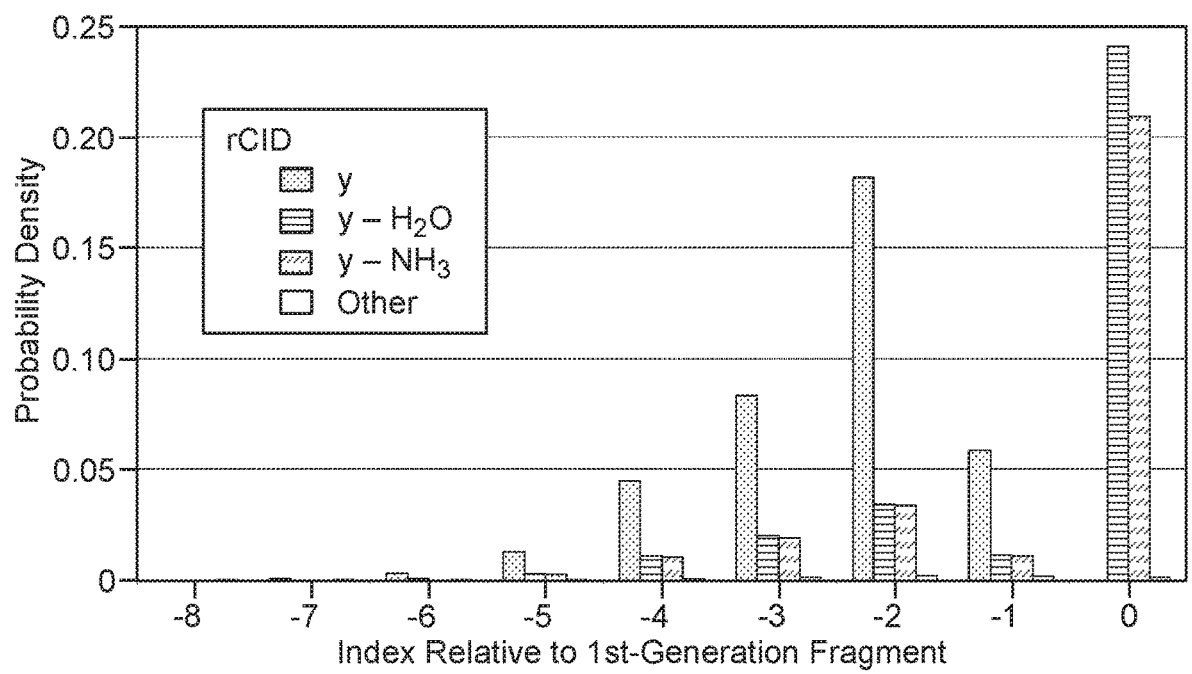
FIG. 4B is a set of histograms of the observed distributions of various ion types, relative to assigned fragment-ion indices, of second-generation fragment-ion unique sequences obtained by fragmenting selected first-generation fragment ions of the tryptic digest of FIG. 2 using resonant-excitation-type collision-induced dissociation, wherein the digest was fractionated in a nano-liquid chromatography separation having a 40-minute gradient and wherein each fragment-ion index is taken relative to the m/z of the respective doubly-charged precursor ion.

Subsequently, a second set of experiments was performed in which MS-3 data was collected on a large group of peptides. The 40 minute gradient with DDA analysis was extended such that, for each MS-2 spectrum, the three most abundant first-generation fragment-ion species having m/z greater than the precursor were selected for isolation and fragmentation, thereby yielding second-generation fragment ions. This experiment was performed four times, twice with beam-type CID fragmentation (bCID) and twice with resonance CID (rCID) fragmentation. The MS-2 data were analyzed with the PD analysis pipeline, yielding about 4000 sequenced peptides per run, with 3000 total unique peptides. The MS-3 spectra corresponding to each MS-2 spectrum that could be successfully associated with a peptide sequence were analyzed. The {mass, intensity} pairs of each MS-3 spectrum were reorganized such that the mass axis is relative to the respective corresponding first-generation fragment-ion species. The data from the 2+ peptide precursor-ion species are shown in FIGS. 4A and 4B for beam type fragmentation (bCID) and resonant-excitation-type fragmentation (rCID). In both cases, the majority of the ion current is concentrated in the y-type ions and their water and ammonia losses. Therefore, the identities of the MS-3 fragments are known in the majority of cases. It is found that, in general, most of the fragments formed have ink values less than that of the respective first-generation fragment-ion species from which they were generated. For fragmentation of 2+ and especially 3+ MS-3 first-generation fragment ion species, there may be some second-generation fragment ions that are formed at greater m/z, however.

These data can be used to construct a general-purpose method for targeted analysis of peptides with multiplexed MS-3. Given a peptide sequence, a set of MS-2 fragments with predicted greatest abundance should be selected for simultaneous isolation and activation. From the data in FIG. 2, it is observed that picking the MS-2 ion species having m/z greater than the precursor m/z would be a natural choice of boundary, thereby giving a large number of ions available to undergo a second fragmentation and yielding a usable range of m/z for the MS-3 ion species. Accordingly, the ions that should be used for quantification are the MS-3 ion species of m/z less than the lowest m/z of the MS-2 ion species that are selected for subsequent fragmentation.

A practical example of the employment of this methodology is depicted in FIGS. 5A and 5B which illustrate, respectively, an MS-2 mass spectrum and an MS-3 mass spectrum of the peptide composed of the sequence SFANQPLEVVYSK that was mixed into the previously-described HeLa protein-extract tryptic digest, as obtained after fragmentation of the 2+ ion species of the peptide. The lines marked with stars in FIG. 5A denote the first-generation fragment ion species that were co-purified and co-fragmented and the diamonds in FIG. 5B denote the second-generation fragment-ion species that were selected for quantification of the peptide. The criterion used for selection of second-generation fragment ion species for quantification, as used for the results of FIG. 5B, was to select a set of fragment-ion species whose intensities were observed to be positively correlated with one another, such as those ion species whose intensities were observed to co-vary during chromatographic elution. Peaks from interfering contaminant or background ion species do not co-vary with the main peaks and are therefore excluded from consideration in the quantification procedure. Alternatively, the selection may be limited to just y-type ion species, because these are observed to be the most abundant type.

Figure 6A:
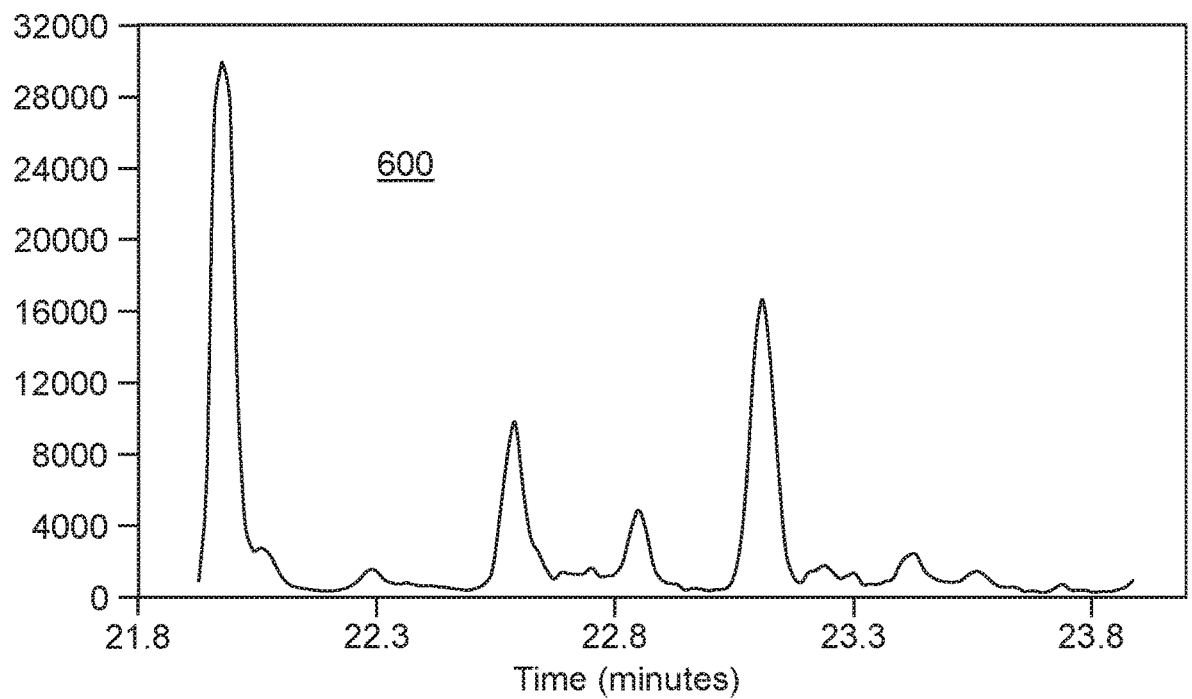
FIG. 6A is a composite ion chromatogram of the selected first-generation y-type fragment ion species indicated in FIG. 5A, as generated during liquid chromatographic fractionation of the peptide composed of the sequence SFANQPLEVVYSK that was mixed into HeLa protein digest, where the plotted curve represents the summation of the intensities of mass spectral lines corresponding to the selected first-generation y-type fragment ion species.
Figure 6B:
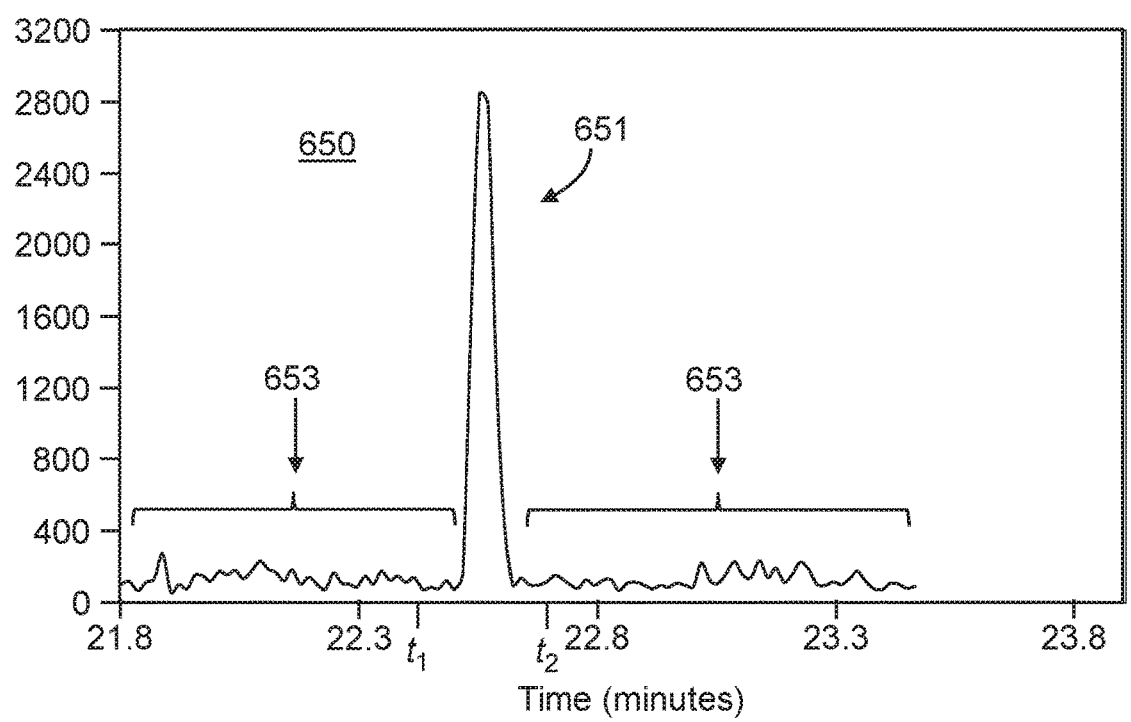
FIG. 6B is a composite ion chromatogram of the selected second-generation y-type fragment ions indicated in FIG. 5B, as generated during liquid chromatographic fractionation of the peptide SFANQPLEVVYSK, where the plotted curve represents the summation of the intensities of mass spectral lines corresponding to the selected second-generation y-type fragment ions.

FIGS. 6A and 6B are ion chromatograms of the MS-2 ions and MS-3 ions formed via bCID that are marked in FIGS. 5A and 5B, respectively, and provide a visual representation of the selectivity improvement that may be achieved by practice of the methods in accordance with the present teachings. Specifically, the graph 600 of FIG. 6A is an ion chromatogram of the y-type MS-2 ions that had no interference, obtained over the course of chromatographic elution of the target peptide SFANQPLEVVYSK. The graph 650 of FIG. 6B is the ion chromatogram derived from the corresponding MS-3 fragments, the peak 651 of which has much less interference, a flatter baseline 653, and thus better selectivity than is exhibited by the MS-2 ion chromatogram.

When the precursor ion (i.e., MS-1 ion species) carries a charge of 2+, then the above-noted selection criteria regarding which first-generation fragment-ion species (i.e., MS-2 ion species) are to be fragmented and which second-generation fragment-ion species (i.e, MS-3 ion species) are to be employed for quantification generally leads to the selection of MS-3 ion species whose m/z values are less than that of the original precursor ion. Therefore, in many instances, a simple selection criterion for choosing the MS-3 ion species may be to choose the $n_2$ most abundant y-type MS-3 ion species having m/z values that are less than the m/z of the precursor ion, where $n_2$ is a pre-decided number. Because there is a broad distribution of MS-3 fragments and because the longer the sequence, the longer the distribution of MS-3 fragments (data not shown here), the best and simplest procedure is to isolate/fragment the first six (as an example) y-type MS-2 ion species (i.e., $n_2 \leq 6$) whose m/z values are greater than the precursor m/z. This restricted number of MS-2 ion species will generally fragment so as to form an appreciable quantity of MS-3 ions whose m/z values are less than the m/z of the precursor ion species, and thus the simple selection criteria noted above may be maintained. Most of the MS-2 fragment abundance is concentrated in the region just above the precursor m/z, and, as disclosed in European publication EP3249678A1 which is incorporated by reference herein in its entirety, multiplexing operations perform best when the least, $(m/z)_1$, and greatest, $(m/z)_2$, of ions to be co-isolated fall within a certain range, for example $(m/z)_2, \leq 2 \times (m/z)_1$.

In the case of selection of multiply charged (3+ or greater) MS-2 ion species for further fragmentation, the m/z range of quantitatively-useful MS-3 ions may be greater. Therefore, best results may be obtained if the MS-3 ion species that are used for quantification include ion species having m/z values that are greater than the m/z value of the greatest m/z of the MS-2 ion species whose fragmentation generated the MS-3 ion species. This complication may be avoided by restricting the MS-2 ion species that are fragmented to only those species that are known to carry a 2+ charge state.

Modifications to the procedures described above can improve the overall results. Traditionally, the activation type that is used to impart fragmentation-inducing energy to multiple precursor ion species is so-called beam type collision-induced dissociation (here abbreviated as bCID) in which ions are caused to receive additional kinetic energy prior to being inlet into a trapping region that also includes neutral gas molecules with which the kinetically-activated ions are caused to collide. However, the presently taught methods are not limited to this mode of activation. Other modes, such as traditional resonant-excitation-type CID (here abbreviated as rCID) can also be used. There are several ways to perform resonance activation and fragmentation of multiple precursors. One such way is to perform the activation and fragmentation in a sequential manner, as was partially disclosed in a 2016 poster presentation (Remes, Philip M. "Multiplexed Targeted Assays Using Ion Trap Waveform Isolation" *Proc. ASMS Ann. Conf.* 2016; *Thermo Fisher Poster Note* 64734) which is incorporated herein by reference in its entirety, and by which each precursor is isolated, one precursor at a time, using a single frequency waveform. It has subsequently been realized that the best way to do sequential activation of multiple precursors is to cause the activation to proceed in sequence from high m/z to low m/z. As an example, let there be two different precursor ion species to be activated, having m/z 300 and m/z 1000. When activating, in the direction from low-to-high m/z, the first precursor (m/z 300) is put at a Mathieu q value of 0.25 for activation, as this value has traditionally been used as the best compromise between the ability to put energy into the precursor, and the ability to capture a wide mass range of product ions generated therefrom. In this situation, the lowest m/z fragment-ion species that can be captured is (0.25×300)/0.908=82 Th. When the next precursor (m/z 1000) is put at q=0.25 for activation, the lowest m/z fragment that can be captured is (0.25×1000)/0.908=275 Th. Thus, using the low-to-high sequential activation procedure causes most of the fragments formed from the m/z 300 ion species to be lost. However, by proceeding in the opposite direction, from high m/z precursor activation to low m/z precursor activation, the fragment-ion loss is not as severe. In this latter situation, the m/z 1000 ion forms its fragments down to m/z 275, and then m/z 300 is activated, and it makes its fragments down to m/z 82.

Proceeding from high to low m/z when activating and fragmenting MS-2 ion species is also useful because any MS-3 fragment species formed from the high m/z MS-2 species that remain when a lower m/z MS-2 species is fragmented can themselves be further fragmented so as to generate smaller fragments whose m/z values will then fall into the m/z region that has been chosen for quantification. For example, FIG. 4 shows that the highest abundance MS-3 fragments correspond to a loss of only 2 residues, with the result that, in the absence of the further fragmentation provided by the high-to-low activation, the m/z values of some MS-3 ion species may fail to coincide with the quantification region. Therefore, this high-to-low activation procedure becomes increasingly useful with an increase in the number of MS-2 ion species that are fragmented.

Because there is an advantage to activating from high to low m/z, but some of the MS-2 fragment ions are not y ions (FIG. 2), another technique that can be used is to activate all ions within an entire m/z region. That is, instead of activating and fragmenting just the y-type ion species having m/z values greater than the precursor m/z, all ions in that m/z region may be activated and fragmented. This could be achieved by ramping the trapping radio frequency (RF) amplitude applied to electrodes of a fragmentation cell from high to low voltage, thereby causing ions of to pass through the activation frequency at q=0.25 in the sequence high to low m/z. Additionally, a waveform with multiple frequency components could be applied over a region or regions with a static trapping RF amplitude. In this simultaneous activation case, it is necessary to apply the knowledge gained from co-owned U.S. Pat. No. 9,875,885B2, incorporated herein by reference in its entirety, to apply an excitation waveform with the correctly scaled frequency components, such that multiple precursors with different mass and q can be activated simultaneously.

Figure 7A:
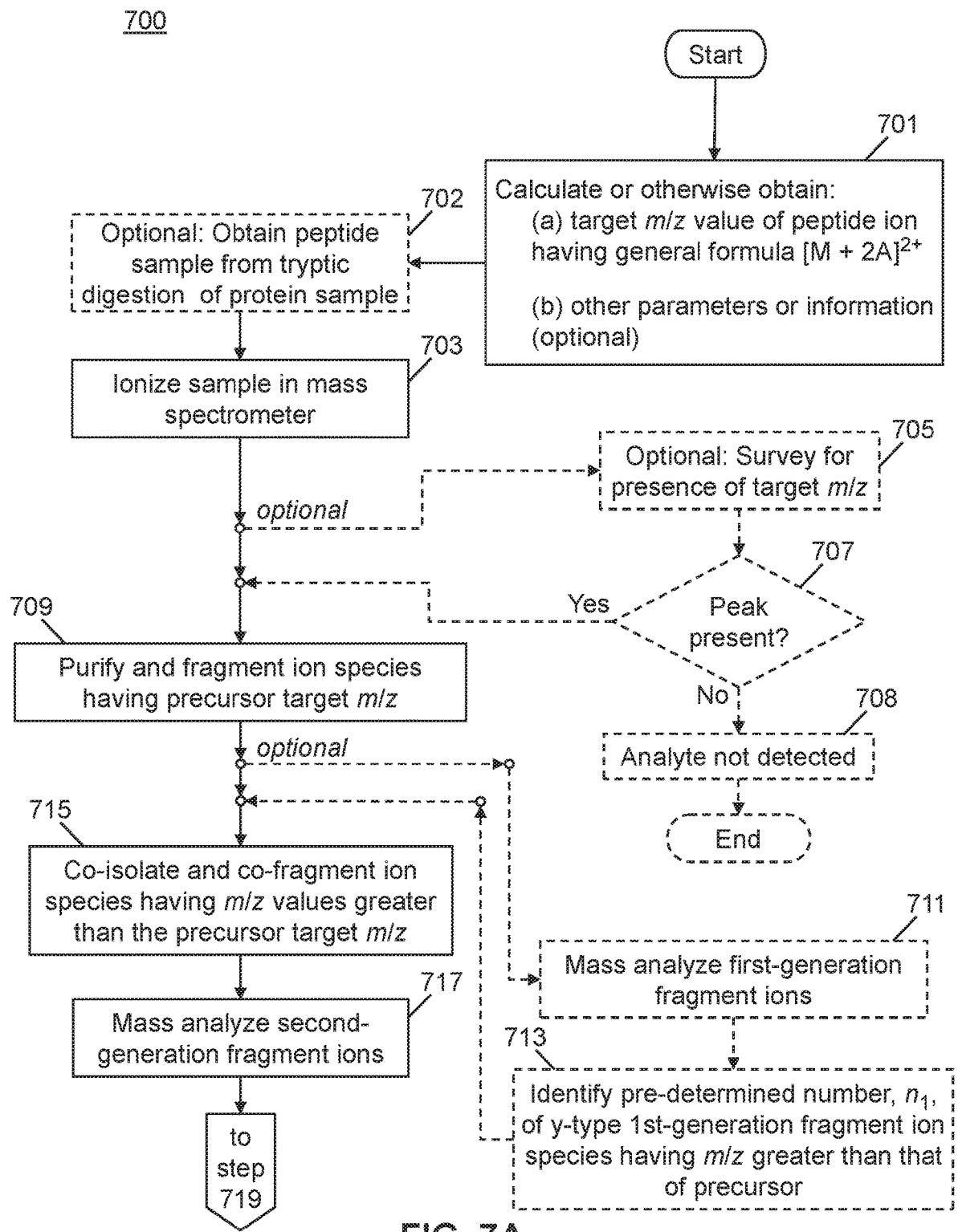
FIGS. 7A-7B are two partial views of a flow chart of a first method for targeted mass spectral analysis in accordance with the present teachings.
Figure 7B:
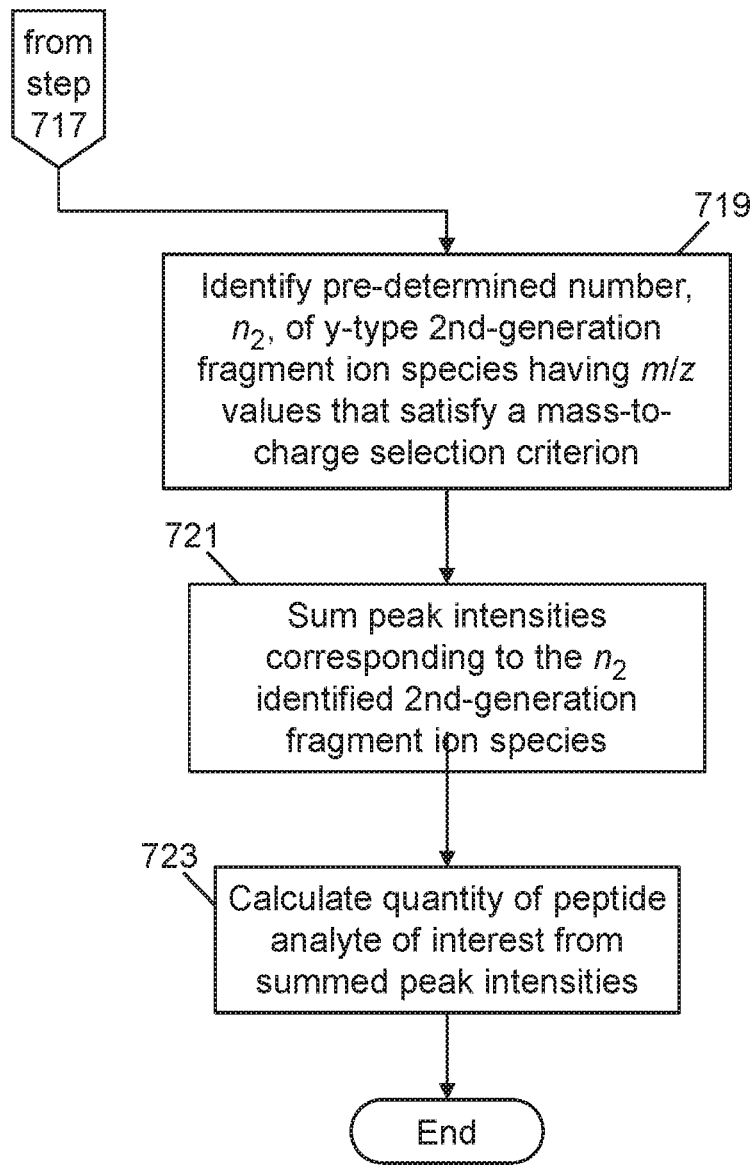
Figure 8A:
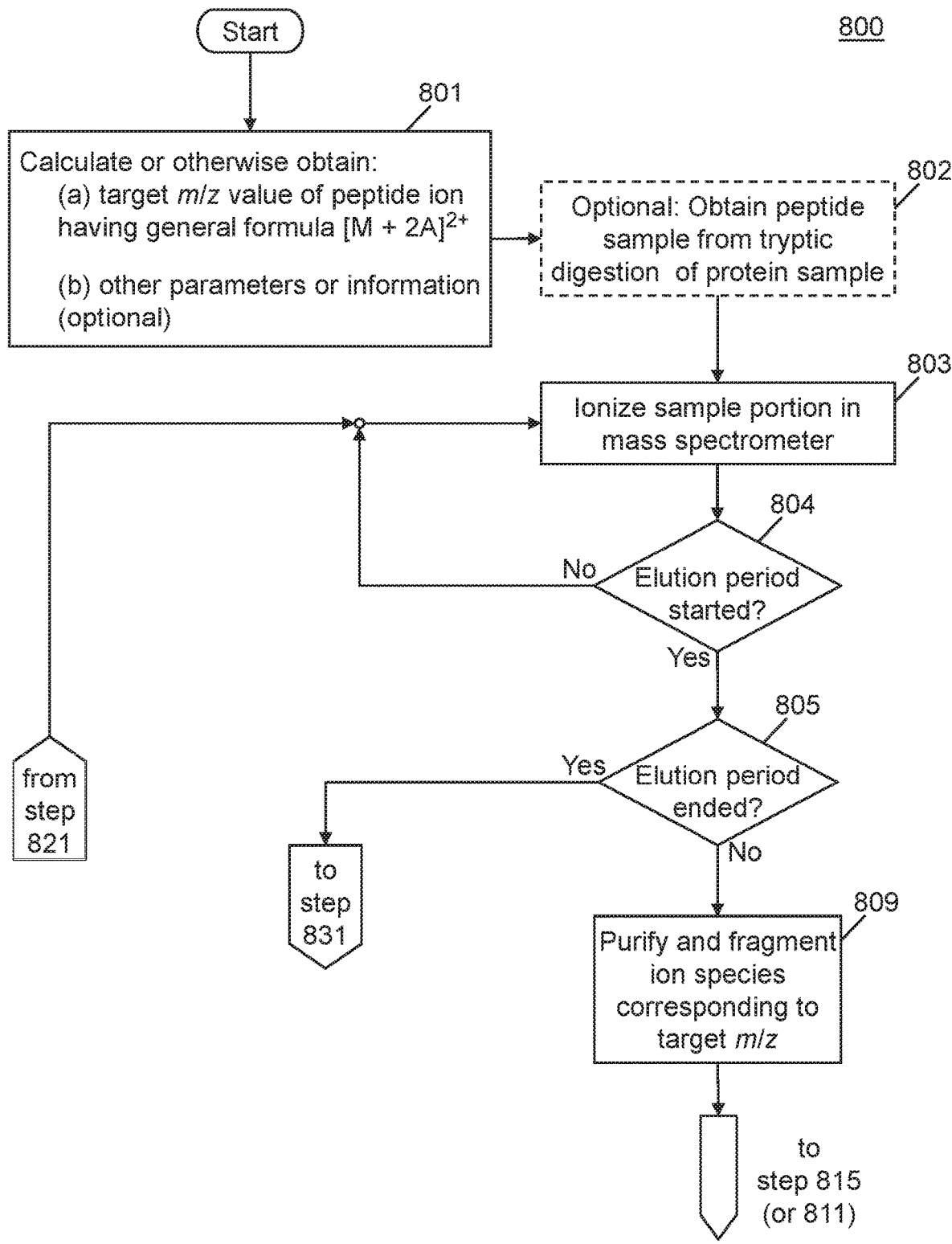
FIGS. 8A-8C are three partial views of a flow chart of a second method for targeted mass spectral analysis in accordance with the present teachings.
Figure 8B:
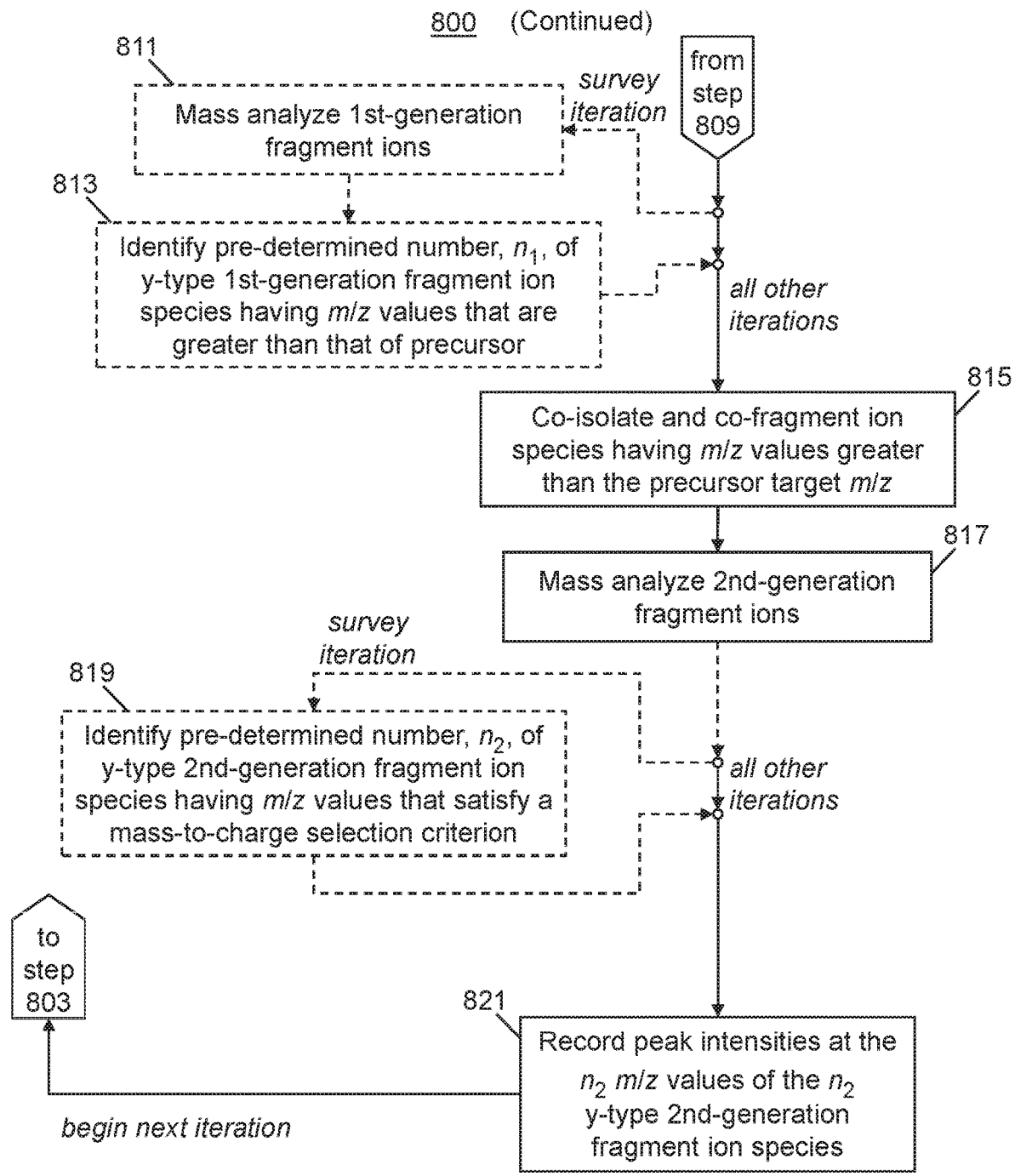
Figure 8C:
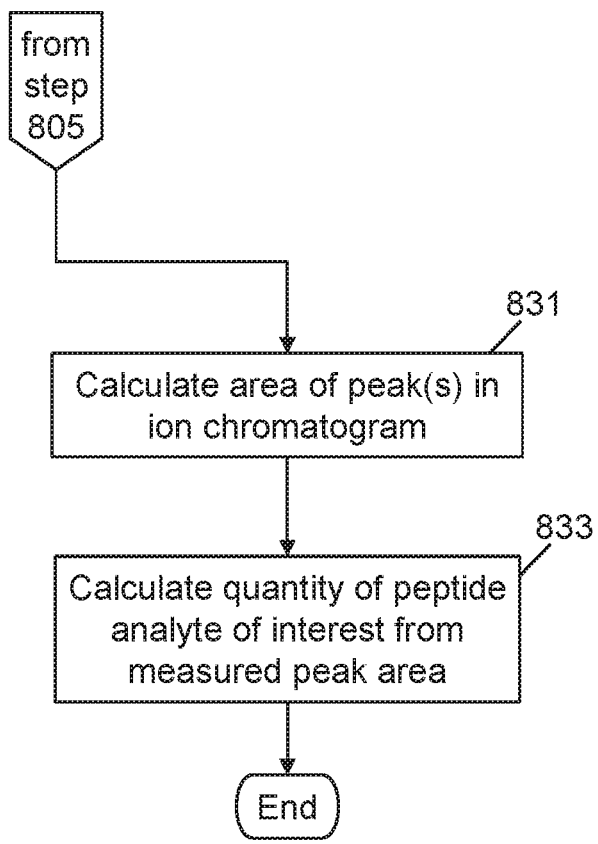

To better illustrate the above-described processes, the set of FIGS. 7A-7B and the set of FIGS. 8A-8C depict flow charts of respective first and second methods for targeted mass spectral analysis in accordance with the present teachings. The method 700 outlined in FIGS. 7A-7B is directed to making a qualitative or quantitative determination relating to a peptide analyte, wherein the determination is based on the result of a single mass analysis or, alternatively, on the aggregate result of a set of mass analyses made of an individual sample whose composition does not change. The method 800 that is outlined in in FIGS. 8A-8C is directed to making a qualitative or quantitative determination relating to a peptide analyte, wherein the determination is based on a series of mass spectral analyses that are made over the course of elution of the analyte as, for instance, from a chromatographic column.

The method 700 (FIGS. 7A-7B) commences with the retrieval (step 701) of a target mass-to-charge (m/z) value of a targeted ion species of a peptide analyte of interest, where the targeted ion species has the general formula $[M+2A]^{2+}$ as defined above. It is here assumed that the target m/z value (or values) is a priori known to correspond to an ion species that is generated upon ionization of the target analyte when ionized under the particular ionization conditions corresponding to those used in the performing of the method. The value or values could be retrieved from computer-readable storage, such as a database, could be calculated based on an assumed composition of the peptide molecule, M, and adducts, A, could be input by a user, could be retrieved from the Internet, etc.

In step 703 of the method 700, the sample or a sample portion is ionized using an ion source 903 (FIG. 9) of the mass spectrometer, where the ion source is of a type, such as an electrospray-type ion source, that can generate a measurable proportion of peptide ions having the general formula $[M+2A]^{2+}$. A sample may be derived from any specimen containing or suspected of containing a peptide analyte of interest. Biological specimens may include blood, serum, plasma, urine, stool, sputum, brochiallavage, nasopharangeallavage, perspiration, tears, extracts of solid tissue, swabs (from all bodily sites, including skin), cerebrospinal fluid, or saliva, for example. Environmental samples may include, for example, food, water, or environmental surface samples. Any of the foregoing samples, alone or in combination, may be suspended in appropriate media, for example, within a solvent.

In general, the sample is prepared in some fashion prior to being presented to the mass spectrometer ion source (step 703). Sample preparation may include such steps as mixing with solvents, extraction, biological cell lysis, centrifugation, addition of chemical reagents or buffers, filtering, fractionation or other chemical separation, etc. Optionally the sample preparation may include (optional step 702) obtaining peptides by proteolytic enzyme digestion (such as, for example, digestion by trypsin) of a protein or proteins of a biological sample. Under some experimental circumstances, the combined presence of a small number (3-5) of certain specific peptides within the sample may be diagnostic of the presence of a particular targeted protein in the biological sample from which the enzymatic digest was derived. Accordingly, if the target peptide analyte is one of such a set of peptides, then a positive indication of the presence of the target peptide in the sample by execution of the method 700 may require the method to be repeated in order to also investigate whether the other peptides of the set are present in the sample.

In some variations of the method 700, the optional 705 may be executed, whereby the mass spectrometer is operated so as to survey for the presence of the target m/z value, indicative of the target ion species that may be derived by ionization of the targeted analyte. If, from the survey, it is determined (step 707) that a mass spectral peak corresponding to the target m/z value has not been observed in the survey, then it may be inferred (step 708) that the targeted analyte is not present in the sample in a measureable amount and execution of the method 700 may thus terminate. Generally, however, execution of the method 700 proceeds from step 703 to step 709 at which the ion species corresponding to the selected target m/z is purified and fragmented. The ion species that is fragmented is thus a precursor ion species and the fragment ions (product ions) that are generated by the fragmentation are first-generation fragment ion species (also referred to herein as MS-2 ion species). The fragmentation may be performed by either beam-type collision-induced dissociation (bCID) or resonant-excitation-type collision-induced dissociation (rCID).

Generally, execution of the method 700 proceeds from step 709 to step 715, at which a portion of the first-generation fragment ion species are themselves co-isolated and co-fragmented, thereby generating a population of second-generation fragment-ion species (i.e., MS-3 ion species). The first-generation fragment-ion species that are further fragmented in step 715 all have ink values that are greater than the precursor target m/z. The fragmentation of step 715 may be performed by either beam-type collision-induced dissociation (bCID) or resonant-excitation-type collision-induced dissociation (rCID). If the rCID procedure is employed, then, preferably, sequential activation and fragmentation of the multiple first-generation fragment ions proceeds in an order from high m/z to low m/z values of these first-generation fragment ions.

In variations of the method 700, optional steps 711 and 713 may intervene between the steps 709 and 715. In optional step 711, the first-generation fragment ion species that are generated by the first fragmentation (step 709) are mass analyzed. Then, based on the results of this mass analysis, a certain number, $n_1$, of the first-generation fragment ion species are identified (i.e., selected) in step 713 as precursor ions for the further fragmentation in step 715, where number $n_1$ is a positive integer that may comprise a pre-decided constant value. In accordance with the present teachings, the selected first-generation fragment ion species are y-type ion species having m/z values that are greater than the m/z value of the precursor ion species. Preferably, the first-generation fragment ion species that are selected in step 713 are the $n_1$ most-abundant y-type ion species that satisfy the m/z condition specified above (e.g., the most abundant y-type ions plotted at positive indices in FIG. 2). Otherwise, if abundance is not used as a peak selection criterion, a subset of the peaks having m/z values that are greater than the m/z value of the precursor may be determined by simply counting the peaks, up to the number $n_1$, in order of ascending m/z, commencing with the fragment ion peak whose m/z value is closest to that of the precursor. The value of the number, $n_1$, may be decided arbitrarily or, more preferably, may be decided based upon user prior knowledge of an approximate number of useable peaks that may be expected, such as described in the preceding paragraphs.

Figure 2:
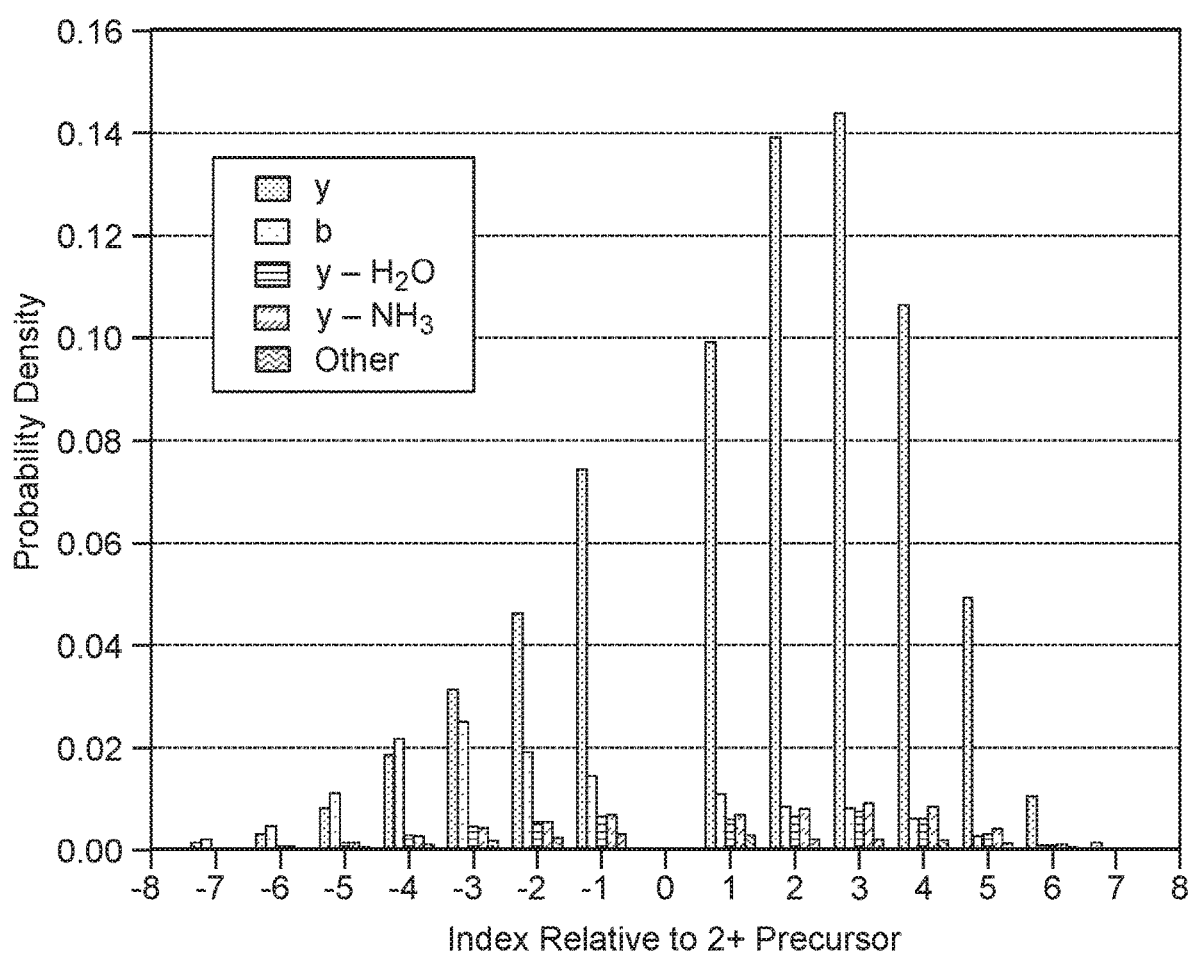
FIG. 2 is a set of histograms of the observed distributions of various ion types, taken over assigned fragment-ion indices, of approximately 43000 fragment-ion unique sequences of a tryptic digest of a HeLa protein extract, as resulted from fractionation of the digest in a nano-liquid chromatography separation having a 140-minute gradient, wherein each fragment-ion index is taken relative to the m/z of the respective doubly-charged precursor ion.

Mass spectral peaks corresponding to y-type ion species may be recognized by the presence of peaks that correspond to the complementary b-type ion species in the results of the same mass analysis (see FIG. 1). Once the peaks representing the y-type ion species have been recognized, then, as is illustrated in FIG. 2, such y-type ions are primarily distributed among only a small number fragment ion species (e.g, 5-7 of such species). The above-described logical sub-steps of selection step 713 may be implemented algorithmically and thus performed automatically by controller 908 (FIG. 9). It should be noted that the mass analysis step (step 711) and the identification and selection step (713) may often be skipped because, as may be observed from FIG. 2, y-type fragment-ion species will be present in great abundance relative to other fragment-ion types in the ink region that are greater than the precursor-ion m/z.

The second-generation fragment ions produced ion step 715 are subsequently mass analyzed in step 717. Based on the results of this mass analysis, a certain integer number, $n_2$, of the mass spectral peaks of second-generation fragment ion species are identified (i.e., selected) in step 719 (FIG. 7B) as markers for determination of quantitative abundance of the targeted analyte. The number, $n_2$, may be an integer constant that is pre-decided based upon prior user knowledge of the approximate number of such second-generation fragment-ion species that may be expected. In accordance with the present teachings, the peaks that are selected for the quantitative abundance determination are those whose m/z values satisfy a pre-decided mass-to-charge selection criterion. According to some embodiments, the mass-to-charge selection criterion requires each selected peak to comprise an m/z value that is less than the m/z value of the original precursor ion species (i.e., the target m/z of earlier step 705). According to some other embodiments, the mass-to-charge selection criterion requires each selected peak to comprise an m/z value that is less than the lowest m/z value among all of the first-generation fragment-ion species that are fragmented in step 709. (It is also possible that at least some selected peaks will satisfy both of the above criteria.)

Preferably, the step 719 comprises selecting a set of peaks of second-generation fragment-ion species whose peak intensities exhibit a positive correlation with one another in time such as, for example, co-varying over the course of a chromatographic elution. The selected set may comprise all such ion peaks whose intensities are correlated and that satisfy one of the mass-to-charge selection criteria as noted above. Alternatively, the selected set may comprise only the $n_2$ most-intense peaks whose intensities are correlated and that satisfy one of the mass-to-charge selection criteria. Alternatively, the selected set may comprise peaks of only y-type second-generation fragment-ion species such as, for example, the $n_2$ most-intense peaks of y-type ion species that satisfy one or the other of the ink selection criteria specified above. As is well known, abundance may be determined or estimated from mass spectral peak heights, preferably above baseline, or, alternatively, by the integrated areas under mass spectral peaks, preferably after baseline correction. If peak intensity is not used as a peak selection criterion, a subset of either the correlated peaks or the y-type peaks that satisfy an ink selection criterion may be determined by simple counting in a similar fashion as described with regard to optional step 713, with the exception that the y-type mass spectral peaks are counted from high index to low index (see FIG. 2). Accordingly, the logical sub-steps of the selection step 719 may be implemented algorithmically and thus performed automatically.

In step 721 of the method 700, the peak intensities of the $n_2$ mass spectral peaks (as determined in step 719) are summed. The peak intensities may be determined from mass spectral peak heights, preferably above baseline, or, alternatively, by the integrated areas under mass spectral peaks, preferably after baseline correction. Then, the execution passes to step 723 at which the sum of the peak intensities is used to perform a quantitative or semi-quantitative determination of the abundance or relative abundance of the peptide analyte of interest within the sample. This step may include reporting or recording the determined abundance or relative abundance. The quantitative or semi-quantitative determination may require a prior calibration of the intensity scale of the mass spectrometer output, using a known quantity of a suitable calibrant material. Alternatively, the quantitative or semi-quantitative determination may employ a comparison to a suitable internal standard that comprises similar chemical properties as the analyte of interest and that has been added to the sample in a known amount and subjected to all of the prior analysis steps as described above. After execution of the step 723, execution of the method 700 may end.

FIGS. 8A-8C are three partial views of a flow chart of a second method for targeted mass spectral analysis in accordance with the present teachings. The method 800 that is outlined in in FIGS. 8A-8C is directed to making a determination that is based on a series of mass spectral analyses that are made over the course of elution of an analyte as, for instance, from a chromatographic column. The quantitative analysis of an analyte of interest is not derived from any single mass spectral measurement but, instead, is calculated by determining the area under the curve of an ion chromatogram, some examples of which are depicted in FIGS. 6A-6B.

Many of the steps of the method 800 are similar are substantially identical to steps of the method 700. In particular, the steps 801, 802, 803, 809, 811, 813, 815, and 819 (FIGS. 8A-8B) are substantially identical to the steps 701, 702, 703, 709, 711, 713, 715, and 719, respectively, of the method 700 and so are not re-described here. The main core of the method 800 comprises the repeatedly executed set of steps 803, 804, 805, 809, 815, 817 and 821, possibly supplemented by one or more executions of the optional steps 811, 813, and 819. Each execution of this set of steps corresponds to a respective time point (i.e., a respective retention time) during a known or anticipated chromatographic elution period of the peptide analyte of interest. At each time point, an MS-3 analysis is conducted and the results contribute to the construction of an ion chromatogram, time-point-by-time point, that is specific to the analyte. At the completion of the elution period, the experimentally measured signal intensities are summed so as to determine the "area under the curve" of the ion chromatogram. Each execution of the initial step 803 comprises ionization of a respective portion of a sample (e.g., an eluate emerging from a chromatographic column at a particular time) as the portion is introduced into an ionization source of a mass spectrometer as one of a continuous stream of such portions.

Prior to the elution period noted above, a wait time may be implemented by repeatedly cycling through steps 803 and 804 by repeatedly following the "no" branch of decision step 804. The determination, made in step 804, of whether an elution period has begun may be performed in one of more of a variety of ways. For example, an approximate start time (as well as an end time) of the elution period may be known from prior chromatographic separation of the analyte under similar experimental conditions. Accordingly, step 804 may comprise consultation of a timer and subsequent comparison between an actual elapsed time (with respect to a reference experiment start time) and the expected start time. In order to determine a baseline for an expected peak of an ion chromatogram (e.g., peak 651 of FIG. 6B), it may be desirable to commence the experimental elution period slightly prior to the actual start of elution, as at time ti indicated in FIG. 6B. Alternatively or perhaps additionally, the start of the elution period may be determined by continuous measurement of total ion current, as measured by a main or auxiliary ion detector of a mass spectrometer. The time at which an increase in ion current is observed may be correlated to an expected start of elution of the analyte. As a yet further alternative, each execution of step 804 may comprise a survey mass analysis to determine whether a mass spectral peak is observed at the ink value of the target precursor ion. Once the start of the elution period has been recognized, by whatever means employed, then execution proceeds to step 805 via the "yes" branch of step 804. The end of the elution period, as determined in decision step 805, may be made in a similar fashion.

At each time point during the elution period, the target precursor ion species is purified and fragmented in step 809 and the so-generated first-generation fragment ion species having ink values greater than the target ink of the precursor ion are co-isolated and co-fragmented in step 815 (FIG. 8B). Generally, execution of the method 800 may proceed directly from step 809 to the fragmentation step 815 without mass analysis and ion selection and isolation because, as may be observed from FIG. 2, y-type fragment-ion species will be present in great abundance relative to other fragment-ion types in the ink region that is greater than the precursor-ion m/z. Nonetheless, in variations of the method 800, optional steps 811 and 813 may intervene between the steps 809 and 815. In optional step 811, the first-generation fragment ion species that are generated by the first fragmentation (step 809) are mass analyzed. Then, based on the results of this mass analysis, a certain number, $n_1$, of the first-generation fragment ion species are identified (i.e., selected) in step 813 as precursor ions for co-isolation and co-fragmentation in step 815, where the number, $n_1$, is a positive integer that may comprise a pre-decided constant value. In accordance with the present teachings, the selected first-generation fragment ion species are y-type ion species having m/z values that are greater than the m/z value of the precursor ion species. Preferably, the selected first-generation fragment ion species that are selected in step 813 are the $n_1$ most-abundant y-type ion species that satisfy the m/z condition specified above (e.g., the most abundant y-type ions plotted at positive indices in FIG. 2). Otherwise, if abundance is not used as a peak selection criterion, a subset of the peaks having ink values that are greater than the ink value of the precursor may be determined by simply counting the peaks, up to the number $n_1$, in order of ascending m/z, commencing with the fragment ion peak whose m/z value is closest to that of the precursor. The value of the number, $n_1$, may be decided arbitrarily or, more preferably, may be decided based upon user prior knowledge of an approximate number of useable peaks that may be expected, such as described earlier herein.

In the fragmentation step 815, first-generation fragment-ion species are co-isolated and further fragmented so as to generate a set of second-generation fragment-ion species. The second-generation fragment-ion species are then mass analyzed in step 817 and, based on the mass analysis, the peak intensities corresponding to a certain number, $n_2$, of selected second-generation fragment-ion species are then recorded in step 821. Step 821 may alternatively comprise or may also include summing the $n_2$ peak intensities. The peak intensities measured and recorded at each execution of steps 817 and 821 correspond to a respective time point during the elution period of the peptide analyte. Accordingly, after each execution of step 821, the method 800 branches back to step 803 (FIG. 8A) at which precursor ions for the subsequent time point are generated.

Since there may not be a priori knowledge about the m/z values of the second-generation fragment-ion species whose peak intensities are to be recorded, it may be necessary to determine these values in at least one iteration of the execution of steps 803-821. Accordingly, in at least one such iteration, the survey step 819 may be executed. In step 819, the pre-decided number, $n_2$, of second-generation fragment-ion species are identified and selected. In accordance with the present teachings, the selected peaks correspond to second-generation fragment ion species whose m/z values satisfy a pre-decided mass-to-charge selection criterion. According to some embodiments, the mass-to-charge selection criterion requires each selected peak to comprise an m/z value that is less than the m/z value of the original precursor ion species (i.e., the target m/z of earlier step 801). According to some other embodiments, the mass-to-charge selection criterion requires each selected peak to comprise an m/z value that is less than the lowest m/z value among all of the first-generation fragment-ion species that are fragmented in step 809. (It is also possible that at least some selected peaks will satisfy both of the above criteria.)

Preferably, the step 819 comprises selecting a set of peaks of second-generation fragment-ion species whose peak intensities exhibit a positive correlation with one another in time such as, for example, co-varying over the course of the chromatographic elution. The selected set may comprise all such ion peaks whose intensities are correlated and that satisfy one of the mass-to-charge selection criteria as noted above. Alternatively, the selected set may comprise only the $n_2$ most-intense peaks whose intensities are correlated and that satisfy one of the mass-to-charge selection criteria. Alternatively, the selected set may comprise peaks of only y-type second-generation fragment-ion species such as, for example, the $n_2$ most-intense peaks of y-type ion species that satisfy one or the other of the ink selection criteria specified above. As is well known, abundance may be determined or estimated from mass spectral peak heights, preferably above baseline, or, alternatively, by the integrated areas under mass spectral peaks, preferably after baseline correction. If peak intensity is not used as a peak selection criterion, a subset of either the correlated peaks or the y-type peaks that satisfy an ink selection criterion may be determined by simple counting in a similar fashion as described with regard to optional step 713 of the method 700, with the exception that the y-type mass spectral peaks are counted from high index to low index (see FIG. 2). Accordingly, the logical sub-steps of the selection step 819 may be implemented algorithmically and thus performed automatically.

Once the elution period of the peptide analyte of interest has ended, as determined in step 805, execution of the method 800 branches to step 831 (FIG. 8C) at which the area under the curve of the ion chromatogram peak corresponding to the analyte is calculated. This calculation makes use of the intensity data previously determined for all time points during the multiple executions of step 821. If the various peak intensities at each of the various time points have not been previously summed in step 821, then that summation may be performed as part of the calculation in step 831. The calculation may include performing a baseline correction, in known fashion, to the measured data of time points corresponding to elution of the analyte (e.g., peak 651 of FIG. 6B), provided that some of the time points correspond to baseline sections 653. The step 831 may further include various of the well-known mathematical steps of signal-to-noise analysis, curve smoothing, least-squares peak modeling and fitting, integration, etc. Subsequently, a quantitative or semi-quantitative determination of the abundance of the peptide analyte is made in step 833, using the calculated area of step 831. Either step 831 or step 833 may make use of a prior calibration of the intensity scale of the mass spectrometer output, using a known quantity of a suitable calibrant material. Alternatively, the quantitative or semi-quantitative determination may employ a comparison to a suitable internal standard that comprises similar chemical properties as the analyte of interest and that has been added to the sample in a known amount and subjected to all of the prior analysis steps as described above.

The discussion included in this application is intended to serve as a basic description. However, the reader should be aware that the specific discussion may not explicitly describe all possible related embodiments and that many alternatives are implicit. Accordingly, one of ordinary skill in the art will readily recognize that there could be variations to the illustrated embodiments without departing from the spirit and scope of the present teachings. For example, although the method 700 and the method 800 have both been illustrated and described under the assumption that the only a priori available information about the target analyte is the m/z of a single precursor ion, it should be readily apparent to one of ordinary skill in the art that additional information relating to possible precursor ion species (MS-1 ion species), first-generation fragment ion species (MS-2 ion species) and second-generation fragment ion species (MS-2 ion species) may also be available in various situations. In such instances, the information retrieval steps (steps 701 and 801) may be modified so as to input the some or all of this additional information.

In some variations, the depicted methods 700 and 800 utilize mass analysis steps (e.g., steps 711, 817) and mass spectrum peak-search steps (e.g., steps 713, 719, 819), any or all of which may be performed automatically, in order to "discover" the mass spectral peaks of first-order and second-order fragment ion species to fragment and reliably use for quantitation, respectively. Accordingly, the methods of the present teachings are advantageous in that they permit qualitative and quantitative analysis of certain peptide analytes, even in situations in which the precise fragmentation behavior of the particular analyte of interest (the target analyte) is not known in advance. These methods may also utilize an additional step comprising mass analysis (e.g., steps 705, 804, 805) to verify the presence of a precursor ion species of interest within a sample. One of skill in the art may readily realize that, once the identities of these peaks have been so discovered, this information may then be made available in a database to be employed for subsequent execution of the method(s). Accordingly, the depicted methods 700 and 800 could be modified so as to include steps of writing the discovered information to a database. Each entry in the database may include a description of a peptide analyte, information pertaining to experimental conditions employed at the time of acquisition of data corresponding to the analyte and the m/z values and intensities of peaks corresponding to MS-1, MS-2 and MS-3 ion species that are observed upon execution of the methods as described herein. Once the information has been tabulated in a database and curated, then future instances of execution of the methods may optionally include input of such data from the database (e.g., optional parts b of steps 701 and 801) because the generation of fragment ion species should be reproducible, provided that experimental conditions do not vary.

Neither the description nor the terminology provided herein is intended to limit the scope of the invention. Any patents, patent applications, patent application publications or other literature mentioned herein are hereby incorporated by reference herein in their respective entirety as if fully set forth herein.

What is claimed is:

1. A method for mass spectrometry of a target peptide comprising:
    (a) receiving or calculating a precursor mass-to-charge value, $(m/z)_p$, of a target precursor-ion species having the formula $[M+2A]^{2+}$, where M represents the composition of the neutral target peptide molecule and each adduct, A, is either a proton or an alkali-metal cation;
    (b) introducing a sample into an ion source of a mass spectrometer, wherein the ion source is capable of generating the target precursor ion species by ionization of the target peptide, if present, in the sample;
    (c) generating ions from the sample by the ion source;
    (d) purifying and fragmenting ions comprising the $(m/z)_p$, thereby generating a plurality of first-generation fragment-ion species (MS-2 species) therefrom;
    (e) co-purifying and co-fragmenting a subset of the plurality of generated MS-2 species, thereby generating a plurality of second-generation fragment-ion species (MS-3 species) therefrom, wherein each of the co-purified and co-fragmented MS-2 species comprises a respective fragment mass-to-charge value, $(m/z)_f$, that is greater than $(m/z)_p$;
    (f) mass analyzing the MS-3 species and selecting a subset of the plurality of generated MS-3 species, wherein each of the selected MS-3 species comprises a respective second-generation fragment mass-to-charge value, $(m/z)_g$, that satisfies a mass-to-charge selection criterion; and
    (g) determining a quantity of the target peptide in the sample from a summation of mass spectral intensities corresponding to the selected MS-3 species.

2. A method as recited in claim 1, wherein an MS-3 species mass-to-charge value, $(m/z)_g$, satisfies the mass-to-charge selection criterion if $(m/z)_g$ is less than $(m/z)_p$.

3. A method as recited in claim 1, wherein an MS-3 species mass-to-charge value, $(m/z)_g$, satisfies the mass-to-charge selection criterion if $(m/z)_g$ is less than the lowest m/z value among all of the MS-2 species that are co-purified and co-fragmented.

4. A method as recited in claim 1, wherein the selecting of the subset of the plurality of generated MS-3 species comprises selecting only MS-3 species that are y-type ion species.

5. A method as recited in claim 1, wherein the selecting of the subset of the plurality of generated MS-3 species comprises selecting only MS-3 species having mass spectral peak intensities that exhibit a positive correlation with one another over time.

6. A method as recited in claim 4, wherein the selecting of the subset of the plurality of generated MS-3 species comprises selecting the $n_2$ most abundant y-type MS-3 species that satisfy the mass-to-charge selection criterion, wherein $n_2$ is a pre-decided positive integer.

7. A method as recited in claim 1, wherein the co-fragmenting of the subset of the plurality of generated MS-2 species comprises sequentially fragmenting the selected MS-2 species of the subset by resonant-excitation-type collision-induced dissociation and in reverse order of their mass-to-charge ratios.

8. A method as recited in claim 1, further comprising recording the m/z values of the ion species of the selected subset of the plurality of generated MS-3 species in a database entry.

9. A method as recited in claim 1, further comprising, after the step (d) of generating the plurality of MS-2 species and prior to the step (e) of co-purifying and co-fragmenting the subset of the plurality of generated MS-2 species:
    mass analyzing the plurality of MS-2 species; and
    selecting the subset of the plurality of generated MS-2 species,
    wherein each of the selected MS-2 species is a y-type ion species.

10. A method as recited in claim 9, wherein the selecting of the subset of the plurality of generated MS-2 species comprises selecting the $n_1$ most abundant y-type MS-2 species for which it is true that $(m/z)_f$ is greater than $(m/z)_p$, wherein $n_1$ is a pre-decided positive integer.

11. A mass spectrometer system comprising:
    a mass spectrometer comprising:
        an ion source;
        an ion selection or purification apparatus configured to receive ions from the ion source;
        a fragmentation cell configured to receive ions from the ion selection or purification apparatus;
        a mass analyzer configured to receive either precursor ions from the ion selection or purification apparatus or fragment ions from the fragmentation cell; and
        a detector configured to receive ions from the mass analyzer;
    a power supply electrically coupled to the mass spectrometer; and
    a controller electrically coupled to the mass spectrometer and the power supply,
    wherein the controller comprises computer-readable instructions operable to cause the controller to:
        calculate or receive a precursor mass-to-charge value, $(m/z)_p$, of a target precursor ion species having the formula $[M+2A]^{2+}$, where M represents the composition of the neutral target peptide molecule and each adduct, A, is either a proton or an alkali-metal cation;
        cause the mass spectrometer to purify and fragment ions comprising the $(m/z)_p$, thereby generating a plurality of first-generation fragment-ion species (MS-2 species) therefrom;
        cause the mass spectrometer to co-purify and co-fragment a subset of the MS-2 species, thereby generating a plurality of second-generation fragment-ion species (MS-3 species) therefrom, wherein each ion species of the subset of MS-2 species comprises a respective fragment mass-to-charge value, $(m/z)_f$, that is greater than $(m/z)_p$;
        cause the mass spectrometer to mass analyze the MS-3 species;
        select a subset of the plurality of generated MS-3 species, wherein each of the selected MS-3 species comprises a respective second-generation fragment mass-to-charge value, $(m/z)_g$, that satisfies a mass-to-charge selection criterion; and
        determine a quantity of the target peptide in the sample from a summation of mass spectral intensities corresponding to the selected MS-3 species.

12. A mass spectrometer system as recited in claim 11, wherein an MS-3 species mass-to-charge value, $(m/z)_g$, satisfies the mass-to-charge selection criterion if $(m/z)_g$ is less than $(m/z)_p$.

13. A mass spectrometer system as recited in claim 11, wherein an MS-3 species mass-to-charge value, $(m/z)_g$, satisfies the mass-to-charge selection criterion if $(m/z)_g$ is less than the lowest m/z value among all of the MS-2 species that are co-purified and co-fragmented.

14. A mass spectrometer system as recited in claim 11, wherein the computer-readable instructions operable to cause the controller to select a subset of the plurality of generated MS-3 species comprise instructions that are operable to cause the controller to select only y-type ion species from the plurality of generated MS-3 species.

15. A mass spectrometer system as recited in claim 11, wherein the computer-readable instructions operable to cause the controller to select a subset of the plurality of generated MS-3 species comprise instructions that are operable to cause the controller to select only MS-3 species having mass spectral peak intensities that exhibit a positive correlation with one another over time.

16. A mass spectrometer system as recited in claim 11, wherein the computer-readable instructions operable to cause the controller to select the subset of the plurality of generated MS-3 species comprise instructions that are operable to cause the controller to select the $n_2$ most abundant y-type MS-3 species that satisfy the mass-to-charge selection criterion, wherein $n_2$ is a pre-decided positive integer.

17. A mass spectrometer system as recited in claim 11, wherein the computer-readable instructions operable to cause the controller to cause the mass spectrometer to co-fragment the subset of the plurality of generated MS-2 species comprise instructions that are operable to cause the controller to cause the mass spectrometer to sequentially fragment the selected MS-2 species of the subset by resonant-excitation-type collision-induced dissociation and in reverse order of their mass-to-charge ratios.

18. A mass spectrometer system as recited in claim 11, wherein the controller comprises further computer-readable instructions operable to cause the controller to record the m/z values of the ion species of the selected subset of the plurality of generated MS-3 species in a database entry.

19. A mass spectrometer system as recited in claim 11, wherein the controller comprises further computer-readable instructions operable to cause the controller to cause the mass spectrometer to, after generating the plurality of MS-2 species and prior to co-purifying and co-fragmenting the subset of the plurality of generated MS-2 species:
mass analyze the plurality of MS-2 species; and
select the subset of the plurality of generated MS-2 species, wherein each of the selected MS-2 species is a y-type ion species.

20. A mass spectrometer system as recited in claim 19, wherein the selecting of the subset of the plurality of generated MS-2 species comprises selecting the $n_1$ most abundant y-type MS-2 species for which it is true that $(m/z)_f$ is greater than $(m/z)_p$, wherein $n_1$ is a pre-decided positive integer.

21. A method for mass spectrometry of a target peptide comprising:
(a) receiving or calculating a precursor mass-to-charge value, $(m/z)_p$, of a target precursor-ion species having the formula $[M+2A]^{2+}$, where M represents the composition of the neutral target peptide molecule and each adduct, A, is either a proton or an alkali-metal cation;
(b) while the target peptide elutes from a chromatographic column:
(b1) introducing a respective sample portion comprising the target peptide into an ion source of a mass spectrometer, wherein the ion source is capable of generating the target precursor ion species by ionization of the target peptide, if present, in the sample;
(b2) generating ions from the sample by the ion source;
(b3) purifying and fragmenting ions comprising the $(m/z)_p$, thereby generating a plurality of first-generation fragment-ion species (MS-2 species) therefrom;
(b4) co-purifying and co-fragmenting a subset of the plurality of generated MS-2 species, thereby generating a plurality of second-generation fragment-ion species (MS-3 species) therefrom, wherein each of the co-purified and co-fragmented MS-2 species comprises a respective fragment mass-to-charge value, $(m/z)_f$, that is greater than $(m/z)_p$; and
(b5) mass analyzing the MS-3 species and recording a plurality of mass spectral intensities, each intensity corresponding to a respective one of a selected subset of the plurality of generated MS-3 species, wherein each of the selected MS-3 species of the subset comprises a respective second-generation fragment mass-to-charge value, $(m/z)_g$, that satisfies a mass-to-charge selection criterion; and
(c) determining a quantity of the target peptide in the sample based on all of the recorded mass spectral intensities.

22. A method as recited in claim 21, wherein an MS-3 species mass-to-charge value, $(m/z)_g$, satisfies the mass-to-charge selection criterion if $(m/z)_g$ is less than $(m/z)_p$.

23. A method as recited in claim 21, wherein an MS-3 species mass-to-charge value, $(m/z)_g$, satisfies the mass-to-charge selection criterion if $(m/z)_g$ is less than the lowest m/z value among all of the MS-2 species that are co-purified and co-fragmented during the generation of the MS-3 species.

24. A method as recited in claim 21, wherein each instance of selecting of the subset of the plurality of generated MS-3 species comprises selecting only y-type ion species.

25. A method as recited in claim 21, wherein each instance of selecting of the subset of the plurality of generated MS-3 species comprises selecting only MS-3 species having mass spectral peak intensities that exhibit a positive correlation with one another over time.

26. A method as recited in claim 21, wherein each instance of selecting of the subset of the plurality of generated MS-3 species comprises selecting the $n_2$ most abundant y-type MS-3 species that satisfy the mass-to-charge selection criterion, wherein $n_2$ is a pre-decided positive integer.

27. A method as recited in claim 21, wherein each instance of the co-fragmenting of the subset of the plurality of generated MS-2 species comprises sequentially fragmenting the selected MS-2 species of the subset by resonant-excitation-type collision-induced dissociation and in reverse order of their mass-to-charge ratios.

* * * * *